(12) United States Patent
Zhang et al.

(10) Patent No.: US 11,989,100 B2
(45) Date of Patent: May 21, 2024

(54) INFORMATION BACKUP METHOD AND RELATED DEVICE

(71) Applicant: Huawei Technologies Co., Ltd., Shenzhen (CN)

(72) Inventors: Xiaoping Zhang, Beijing (CN); Yaokun Zhang, Beijing (CN); Quanxi Zhao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 889 days.

(21) Appl. No.: 17/036,705

(22) Filed: Sep. 29, 2020

(65) Prior Publication Data

US 2021/0011813 A1    Jan. 14, 2021

Related U.S. Application Data

(63) Continuation of application No. PCT/CN2019/079782, filed on Mar. 27, 2019.

(30) Foreign Application Priority Data

Mar. 29, 2018  (CN) .......................... 201810273786.2

(51) Int. Cl.
*G06F 11/00* (2006.01)
*G06F 11/14* (2006.01)
(Continued)

(52) U.S. Cl.
CPC ...... *G06F 11/1464* (2013.01); *H04L 41/0663* (2013.01); *H04L 67/1095* (2013.01); *H04L 69/40* (2013.01)

(58) Field of Classification Search
CPC .................................................. G06F 11/1464
See application file for complete search history.

(56) References Cited

U.S. PATENT DOCUMENTS

| | | | | |
|---|---|---|---|---|
| 5,625,818 A | * | 4/1997 | Zarmer ................. | G06F 16/958 707/999.009 |
| 5,684,984 A | * | 11/1997 | Jones .................... | G06F 16/275 707/613 |

(Continued)

FOREIGN PATENT DOCUMENTS

| | | |
|---|---|---|
| CN | 202309769 U | 7/2012 |
| CN | 102983997 A | 3/2013 |

(Continued)

*Primary Examiner* — Amine Riad
(74) *Attorney, Agent, or Firm* — Conley Rose, P.C.

(57) ABSTRACT

An information backup method applied to a communications system including a primary device, a secondary device, and a cloud device, and the method is performed by the primary device. The method includes sending a first identity notification to the cloud device, where the first identity notification is a notification indicating that the primary device has a primary device identity, and uploading obtained first user information to the cloud device when determining that a communication status of the cloud device is normal, where the first user information is stored by the cloud device and provided to the secondary device, and the first user information is to-be-backed-up information of user equipment that gets online from the primary device when the communication status of the cloud device is normal.

20 Claims, 14 Drawing Sheets

(51) Int. Cl.
*H04L 41/0663* (2022.01)
*H04L 67/1095* (2022.01)
*H04L 69/40* (2022.01)

(56) References Cited

U.S. PATENT DOCUMENTS

| | | | | |
|---|---|---|---|---|
| 5,974,563 | A * | 10/1999 | Beeler, Jr. | G06F 11/2071 |
| | | | | 707/999.204 |
| 8,996,467 | B2 * | 3/2015 | Apte | G06F 11/1456 |
| | | | | 707/741 |
| 9,776,078 | B2 * | 10/2017 | Quan | A63F 13/45 |
| 10,356,218 | B2 * | 7/2019 | Supramaniam | H04L 67/01 |
| 11,228,510 | B2 * | 1/2022 | Kruse | G06F 3/067 |
| 11,249,868 | B2 * | 2/2022 | Dugue | G06F 11/2033 |
| 11,388,189 | B2 * | 7/2022 | Yang | H04L 63/20 |
| 11,640,340 | B2 * | 5/2023 | Sontakke | G06F 11/1464 |
| | | | | 714/4.11 |
| 11,709,741 | B1 * | 7/2023 | Uppal | H04L 45/22 |
| | | | | 714/4.11 |
| 2008/0168183 | A1 * | 7/2008 | Marcy | G06F 16/178 |
| | | | | 709/248 |
| 2009/0072953 | A1 * | 3/2009 | Cagno | H04B 3/544 |
| | | | | 370/228 |
| 2012/0105934 | A1 * | 5/2012 | Kuo | C09B 67/0083 |
| | | | | 359/290 |
| 2012/0113799 | A1 | 5/2012 | Chen et al. | |
| 2013/0166706 | A1 | 6/2013 | Christenson et al. | |
| 2015/0156118 | A1 | 6/2015 | Madani et al. | |
| 2018/0089043 | A1 * | 3/2018 | Nelson | G06F 11/004 |
| 2019/0394079 | A1 * | 12/2019 | Lepoutere | H04L 41/069 |

FOREIGN PATENT DOCUMENTS

| | | |
|---|---|---|
| CN | 103226483 A | 7/2013 |
| CN | 106453120 A | 2/2017 |
| CN | 107038096 A | 8/2017 |
| CN | 107222327 A | 9/2017 |

* cited by examiner

INFORMATION BACKUP METHOD AND RELATED DEVICE

CROSS-REFERENCE TO RELATED APPLICATIONS

This application is a continuation of International Patent Application No. PCT/CN2019/079782 filed on Mar. 27, 2019, which claims priority to Chinese Patent Application No. 201810273786.2 filed on Mar. 29, 2018. The disclosures of the aforementioned applications are hereby incorporated by reference in their entireties.

TECHNICAL FIELD

This application relates to the field of communications technologies, and in particular, to an information backup method and a related device.

BACKGROUND

Currently, enterprise users and individual users have increasingly high requirements for network quality. One of the requirements is continuity of a user service. Accordingly, a redundancy user information (RUI) multi-server backup technology emerges. The RUI multi-server backup technology has been widely applied in a live network on a large scale, for example, RUI backup in the broadband remote access server (BRAS) field and Address Resolution Protocol (ARP) RUI backup in the Internet Protocol (IP) radio access network (IPRAN) field.

An RUI two-node cluster hot backup service in the BRAS field is used as an example. As shown in FIG. 1A, which router is a primary device and which router is a secondary device are first negotiated according to the Virtual Router Redundancy Protocol (VRRP). The primary device is configured to implement traffic forwarding between a user side and a network side, and the secondary device is configured to back up user information. Further, when user equipment gets online from the primary device, the primary device sends user information of the user equipment to the secondary device for backup through a remote backup service (RBS) channel between the primary device and the secondary device. However, as shown in FIG. 1B, when it is detected, using a Bidirectional Forwarding Detection (BFD) technology, that communication between the user equipment and the primary device fails, the user equipment may be rapidly switched to the secondary device based on the backed-up user information. The secondary device takes over work of the primary device to implement traffic forwarding for a service of the user equipment, thereby ensuring continuity of the user service.

In an existing RUI multi-server backup technology, when a relationship between a primary device and a secondary device is unclear, continuity of a user service is affected. For example, for a router 1 and a router 2, when a fault of the router 1 is rectified and a specified WTR value is satisfied, the router 1 is restored to a primary device from a secondary device, and the router 2 is restored to a secondary device from a primary device. Before the specified WTR value is reached, the router 2 is still a primary device, and backs up user information to the router 1. If a speed for backup between the router 1 and the router 2 is relatively low or an RBS between the router 1 and the router 2 has not been established, the router 2 cannot complete backup of the user information before WTR, thereby affecting continuity of a user service.

SUMMARY

Embodiments of this application provide an information backup method and a related device, to ensure continuity of a user service.

To resolve the foregoing problem, the embodiments of this application provide the following technical solutions.

According to a first aspect, an embodiment of this application provides an information backup method, where the method is applied to a communications system, the communications system includes a primary device, a secondary device, and a cloud device, and the method is performed by the primary device, and the method includes sending, by the primary device, a first identity notification to the cloud device, where the first identity notification is a notification indicating that the primary device has a primary device identity, determining, by the primary device, a communication status of the cloud device, and uploading, by the primary device, obtained first user information to the cloud device when determining that the communication status of the cloud device is normal, where the first user information is stored by the cloud device and provided to the secondary device, and the first user information is to-be-backed-up information of user equipment that gets online from the primary device when the communication status of the cloud device is normal. In this embodiment of this application, when the communication status of the cloud device is normal, if user equipment gets online from the primary device, the primary device generates to-be-backed-up information of the user equipment and uploads the to-be-backed-up information to the cloud device. In this way, the secondary device can obtain the to-be-backed-up information from the cloud device for backup. It can be learned that the primary device backs up information to the secondary device using the cloud device. This avoids discontinuity of a user service caused in some scenarios when the primary device directly backs up information to the secondary device, for example, when a relationship between the primary device and the secondary device is unclear.

In a possible design of this application, the method further includes, when the primary device determines that the communication status of the cloud device is abnormal and that the primary device and the secondary device can normally communicate with each other, sending, by the primary device, obtained second user information to the secondary device for backup, where the second user information is to-be-backed-up information of user equipment that gets online from the primary device when the communication status of the cloud device is abnormal. In this embodiment of this application, when the communication status of the cloud device is abnormal, that is, when data backup cannot be implemented using the cloud device, if the primary device and the secondary device can normally communicate with each other, the primary device may directly back up information to the secondary device, to implement local backup. This improves backup reliability.

In a possible design of this application, determining, by the primary device, a communication status of the cloud device includes sending, by the primary device, a first query message to the secondary device after detecting that a link disconnection timeout occurs between the primary device and the cloud device, where the first query message is used to query whether a link disconnection timeout occurs between the secondary device and the cloud device, and determining, by the primary device, the communication status of the cloud device based on a response message received from the secondary device. In this embodiment of this application, if the primary device first detects that the link disconnection timeout occurs between the primary device and the cloud device, the primary device queries whether the link disconnection timeout also occurs between the secondary device and the cloud device such that the primary device may determine, based on the response message from the secondary device, whether the communication status of the cloud device is abnormal.

In a possible design of this application, determining, by the primary device, the communication status of the cloud device based on a response message received from the secondary device includes, if receiving a first response message returned by the secondary device, determining, by the primary device, that the communication status of the cloud device is abnormal, where the first response message is used to notify that a link disconnection timeout occurs between the secondary device and the cloud device, and before sending, by the primary device, obtained second user information to the secondary device for backup, the method further includes starting, by the primary device, a local backup mechanism between the primary device and the secondary device. In this embodiment of this application, if the link disconnection timeout occurs between the primary device and the cloud device and the link disconnection timeout also occurs between the secondary device and the cloud device, the primary device may determine that the communication status of the cloud device is abnormal. In this case, the primary device may start the local backup mechanism and perform local backup.

In a possible design of this application, determining, by the primary device, the communication status of the cloud device based on a response message received from the secondary device includes, if receiving a second response message returned by the secondary device, determining, by the primary device, that the communication status of the cloud device is normal, where the second response message is used to notify that no link disconnection timeout occurs between the secondary device and the cloud device, and the method further includes performing, by the primary device, link reestablishment with the cloud device, and sending, by the primary device, obtained third user information to the cloud device in batches after the link reestablishment succeeds, where the third user information is stored by the cloud device and provided to the secondary device, and the third user information is to-be-backed-up information of user equipment that gets online from the primary device after a link disconnection occurs between the primary device and the cloud device and before the link reestablishment succeeds. In this embodiment of this application, if the link disconnection timeout occurs between the primary device and the cloud device, but no link disconnection timeout occurs between the secondary device and the cloud device, the primary device may determine that the communication status of the cloud device is normal. In this case, the primary device may complete link reestablishment with the cloud device, and implement cloud backup after the link reestablishment succeeds.

In a possible design of this application, determining, by the primary device, a communication status of the cloud device includes receiving, by the primary device, a first notification message sent by the secondary device, where the first notification message is used to notify that a link disconnection timeout occurs between the secondary device and the cloud device, and determining, by the primary device, the communication status of the cloud device based on a link status between the primary device and the cloud device after receiving the first notification message. In this embodiment of this application, if the secondary device first detects that the link disconnection timeout occurs between the secondary device and the cloud device, the secondary device may notify the primary device of this case such that after receiving the notification, the primary device may determine, based on a link status between the primary device and the cloud device, whether the communication status of the cloud device is abnormal.

In a possible design of this application, determining, by the primary device, the communication status of the cloud device based on a link status between the primary device and the cloud device includes, if determining that a link disconnection timeout occurs between the primary device and the cloud device, determining, by the primary device, that the communication status of the cloud device is abnormal, and before sending obtained second user information to the secondary device for backup, the method further includes starting, by the primary device, a local backup mechanism between the primary device and the secondary device. In this embodiment of this application, if the link disconnection timeout occurs between the primary device and the cloud device and the link disconnection timeout also occurs between the secondary device and the cloud device, the primary device may determine that the communication status of the cloud device is abnormal. In this case, the primary device may start the local backup mechanism and perform local backup.

In a possible design of this application, determining, by the primary device, the communication status of the cloud device based on a link status between the primary device and the cloud device includes, if determining that no link disconnection timeout occurs between the primary device and the cloud device, determining, by the primary device, that the communication status of the cloud device is normal, and the method further includes instructing, by the primary device, the secondary device to wait for completing link reestablishment with the cloud device. In this embodiment of this application, if the link disconnection timeout occurs between the secondary device and the cloud device, but no link disconnection timeout occurs between the primary device and the cloud device, the primary device may determine that the communication status of the cloud device is normal. In this case, the primary device may instruct the secondary device to complete link reestablishment with the cloud device such that the secondary device backs up data from the cloud device after the link reestablishment succeeds.

In a possible design of this application, determining, by the primary device, a communication status of the cloud device includes receiving, by the primary device, a second query message sent by the secondary device, where the second query message is sent by the secondary device after the secondary device determines that a link disconnection timeout occurs between the secondary device and the cloud device, and the second query message is used to query whether a link disconnection timeout occurs between the primary device and the cloud device, and determining, by the primary device, the communication status of the cloud device based on a link status between the primary device and the cloud device after receiving the second query message. In this embodiment of this application, if the secondary device first detects that the link disconnection timeout occurs between the secondary device and the cloud device, the secondary device queries whether the link disconnection timeout also occurs between the primary device and the cloud device such that the primary device may determine, based on the link status between the primary device and the cloud device, whether the communication status of the cloud device is abnormal.

In a possible design of this application, determining, by the primary device, the communication status of the cloud device based on a link status between the primary device and the cloud device includes, if determining that a link disconnection timeout occurs between the primary device and the cloud device, determining, by the primary device, that the communication status of the cloud device is abnormal, and before sending obtained second user information to the secondary device for backup, the method further includes sending, by the primary device, a third response message to the secondary device such that the secondary device starts a local backup mechanism between the primary device and the secondary device after receiving the third response message, where the third response message indicates that the link disconnection timeout occurs between the primary device and the cloud device. In this embodiment of this application, if the link disconnection timeout occurs between the primary device and the cloud device and the link disconnection timeout also occurs between the secondary device and the cloud device, the primary device may determine that the communication status of the cloud device is abnormal. In this case, the primary device may notify the secondary device of this case such that after receiving the notification, the secondary device may start the local backup mechanism and perform local backup.

In a possible design of this application, determining, by the primary device, the communication status of the cloud device based on a link status between the primary device and the cloud device includes, if determining that no link disconnection timeout occurs between the primary device and the cloud device, determining, by the primary device, that the communication status of the cloud device is normal, and the method further includes sending, by the primary device, a fourth response message to the secondary device such that after receiving the fourth response message, the secondary device waits for completing link reestablishment with the cloud device, where the fourth response message indicates that no link disconnection timeout occurs between the primary device and the cloud device. In this embodiment of this application, if the link disconnection timeout occurs between the secondary device and the cloud device, but no link disconnection timeout occurs between the primary device and the cloud device, the primary device may determine that the communication status of the cloud device is normal. In this case, the primary device may instruct the secondary device to complete link reestablishment with the cloud device such that the secondary device backs up data from the cloud device after the link reestablishment succeeds.

In a possible design of this application, determining, by the primary device, a communication status of the cloud device includes sending, by the primary device, a second notification message to the secondary device after detecting that a link disconnection timeout occurs between the primary device and the cloud device, where the second notification message is used to notify the secondary device that the link disconnection timeout occurs between the primary device and the cloud device, and determining, by the primary device, the communication status of the cloud device based on a response of the secondary device to the second notification message. In this embodiment of this application, if the primary device first detects that the link disconnection timeout occurs between the primary device and the cloud device, the primary device may notify the secondary device of this case such that the primary device may determine, based on a response result of the secondary device specific to the notification, whether the communication status of the cloud device is abnormal.

In a possible design of this application, determining, by the primary device, the communication status of the cloud device based on a response of the secondary device to the second notification message includes, if determining that the secondary device has started a local backup mechanism between the primary device and the secondary device, determining, by the primary device, that the communication status of the cloud device is abnormal. In this embodiment of this application, if the link disconnection timeout occurs between the primary device and the cloud device and a link disconnection timeout also occurs between the secondary device and the cloud device, the secondary device starts the local backup mechanism. In this case, the primary device may determine that the communication status of the cloud device is abnormal in order to perform local backup.

In a possible design of this application, determining, by the primary device, the communication status of the cloud device based on a response of the secondary device to the second notification message includes, if receiving a notification response message returned by the secondary device, determining, by the primary device, that the communication status of the cloud device is normal, where the notification response message is used to instruct the primary device to wait for completing link reestablishment with the cloud device, and the method further includes performing, by the primary device, link reestablishment with the cloud device, and sending, by the primary device, obtained third user information to the cloud device in batches after the link reestablishment succeeds, where the third user information is stored by the cloud device and provided to the secondary device, and the third user information is to-be-backed-up information of user equipment that gets online from the primary device after a link disconnection occurs between the primary device and the cloud device and before the link reestablishment succeeds. In this embodiment of this application, if the link disconnection timeout occurs between the primary device and the cloud device, but no link disconnection timeout occurs between the secondary device and the cloud device, the primary device may complete link reestablishment with the cloud device, and implement cloud backup after the link reestablishment succeeds.

In a possible design of this application, determining, by the primary device, that the communication status of the cloud device is abnormal includes, if determining that quality of a link between the primary device and the cloud device is lower than a preset quality threshold and/or determining that quality of a link between the secondary device and the cloud device is lower than a preset quality threshold, determining, by the primary device, that the communication status of the cloud device is abnormal. In this embodiment of this application, when determining that the quality of the link between the cloud device and one of the primary device and the secondary device is low, the primary device may determine that the communication status of the cloud device is abnormal. In this case, the primary device may start a local backup mechanism and perform local backup.

In a possible design of this application, the method further includes switching, by the primary device, the primary device identity of the primary device to a secondary device identity when determining that the primary device and the cloud device cannot normally communicate with each other and that the primary device and the secondary device cannot normally communicate with each other. In this embodiment of this application, if the primary device can communicate with neither the cloud device nor the secondary device, it indicates that the primary device can perform neither cloud backup nor local backup. In this case, the primary device may perform primary-secondary identity switching such that the secondary device that can implement cloud backup serves as a primary device to perform cloud backup in order to ensure backup reliability.

In a possible design of this application, that the primary device and the cloud device cannot normally communicate with each other includes the link disconnection timeout occurs between the primary device and the cloud device, or the quality of the link between the primary device and the cloud device is lower than the preset quality threshold. In this embodiment of this application, that the primary device and the cloud device cannot normally communicate with each other may be manifested as the link disconnection timeout or the low link quality.

In a possible design of this application, that the primary device and the secondary device cannot normally communicate with each other includes a link disconnection timeout occurs between the primary device and the secondary device, or quality of a link between the primary device and the secondary device is lower than a preset quality threshold. In this embodiment of this application, that the primary device and the secondary device cannot normally communicate with each other may be manifested as the link disconnection timeout or the low link quality.

According to a second aspect, an embodiment of this application provides an information backup method, where the method is applied to a communications system, the communications system includes a primary device, a secondary device, and a cloud device, and the method is performed by the cloud device, and the method includes receiving, by the cloud device, a first identity notification sent by the primary device and a second identity notification sent by the secondary device, where the first identity notification is a notification indicating that the primary device has a primary device identity, and the second identity notification is a notification indicating that the secondary device has a secondary device identity, and receiving and storing, by the cloud device, first user information uploaded by the primary device, and providing the first user information to the secondary device, where the first user information is uploaded by the primary device when the primary device determines that a communication status of the cloud device is normal, and the first user information is to-be-backed-up information of user equipment that gets online from the primary device when the communication status of the cloud device is normal. In this embodiment of this application, when the communication status of the cloud device is normal, if user equipment gets online from the primary device, the primary device generates to-be-backed-up information of the user equipment and uploads the to-be-backed-up information to the cloud device. In this way, the secondary device can obtain the to-be-backed-up information from the cloud device for backup. It can be learned that the primary device backs up information to the secondary device using the cloud device. This avoids discontinuity of a user service caused when the primary device directly backs up information to the secondary device.

According to a third aspect, an embodiment of this application provides an information backup method, where the method is applied to a communications system, the communications system includes a primary device, a secondary device, and a cloud device, and the method is performed by the secondary device, and the method includes sending, by the secondary device, a second identity notification to the cloud device, where the second identity notification is a notification indicating that the secondary device has a secondary device identity, and obtaining, by the secondary device, first user information from the cloud device for backup, where the first user information is uploaded by the primary device to the cloud device for storage when the primary device determines that a communication status of the cloud device is normal, and the first user information is to-be-backed-up information of user equipment that gets online from the primary device when the communication status of the cloud device is normal. In this embodiment of this application, when the communication status of the cloud device is normal, if user equipment gets online from the primary device, the primary device generates to-be-backed-up information of the user equipment and uploads the to-be-backed-up information to the cloud device. In this way, the secondary device can obtain the to-be-backed-up information from the cloud device for backup. It can be learned that the primary device backs up information to the secondary device using the cloud device. This avoids discontinuity of a user service caused when the primary device directly backs up information to the secondary device.

In a possible design of this application, the method further includes, when the communication status of the cloud device is abnormal, receiving, by the secondary device, second user information sent by the primary device for backup, where the second user information is to-be-backed-up information of user equipment that gets online from the primary device when the communication status of the cloud device is abnormal, and the second user information is sent by the primary device when the primary device determines that the communication status of the cloud device is abnormal and that the primary device and the secondary device can normally communicate with each other. In this embodiment of this application, when the communication status of the cloud device is abnormal, that is, when data backup cannot be implemented using the cloud device, if the primary device and the secondary device can normally communicate with each other, the primary device may directly back up information to the secondary device, to implement local backup. This improves backup reliability.

In a possible design of this application, the method further includes returning, by the secondary device, a response message to the primary device if receiving a first query message sent by the primary device, where the first query message is sent by the primary device after the primary device detects that a link disconnection timeout occurs between the primary device and the cloud device, the first query message is used to query whether a link disconnection timeout occurs between the secondary device and the cloud device, and the response message returned by the secondary device is used by the primary device to determine the communication status of the cloud device. In this embodiment of this application, if the primary device first detects that the link disconnection timeout occurs between the primary device and the cloud device, the primary device queries whether the link disconnection timeout also occurs between the secondary device and the cloud device such that the primary device may determine, based on the response message from the secondary device, whether the communication status of the cloud device is abnormal.

In a possible design of this application, returning, by the secondary device, a response message to the primary device includes returning, by the secondary device, a first response message to the primary device, where the first response message is used to notify that a link disconnection timeout occurs between the secondary device and the cloud device such that after learning that the link disconnection timeout occurs between the secondary device and the cloud device, the primary device determines that the communication status of the cloud device is abnormal, and starts a local backup mechanism between the primary device and the secondary device after determining that the communication status of the cloud device is abnormal, and receiving, by the secondary device, second user information sent by the primary device for backup includes receiving, by the secondary device, the second user information sent by the primary device after the primary device starts the local backup mechanism and used for backup. In this embodiment of this application, if the link disconnection timeout occurs between the primary device and the cloud device and the link disconnection timeout also occurs between the secondary device and the cloud device, the primary device may determine that the communication status of the cloud device is abnormal. In this case, the primary device may start the local backup mechanism and perform local backup.

In a possible design of this application, returning, by the secondary device, a response message to the primary device includes returning, by the secondary device, a second response message to the primary device, where the second response message is used to notify that no link disconnection timeout occurs between the secondary device and the cloud device such that after learning that no link disconnection timeout occurs between the secondary device and the cloud device, the primary device determines that the communication status of the cloud device is normal, performs link reestablishment with the cloud device after determining that the communication status of the cloud device is normal, and sends obtained third user information to the cloud device in batches after the link reestablishment succeeds, where the third user information is stored by the cloud device and provided to the secondary device, and the third user information is to-be-backed-up information of user equipment that gets online from the primary device after a link disconnection occurs between the primary device and the cloud device and before the link reestablishment succeeds. In this embodiment of this application, if the link disconnection timeout occurs between the primary device and the cloud device, but no link disconnection timeout occurs between the secondary device and the cloud device, the primary device may determine that the communication status of the cloud device is normal. In this case, the primary device may complete link reestablishment with the cloud device, and implement cloud backup after the link reestablishment succeeds.

In a possible design of this application, the method further includes sending, by the secondary device, a first notification message to the primary device, where the first notification message is used to notify that a link disconnection timeout occurs between the secondary device and the cloud device such that after learning that a link disconnection timeout occurs between the secondary device and the cloud device, the primary device determines that the communication status of the cloud device is abnormal. In this embodiment of this application, if the secondary device first detects that the link disconnection timeout occurs between the secondary device and the cloud device, the secondary device may notify the primary device of this case such that after receiving the notification, the primary device may determine, based on a link status between the primary device and the cloud device, whether the communication status of the cloud device is abnormal.

In a possible design of this application, the method further includes receiving, by the secondary device, a reestablishment waiting notification sent by the primary device, where the reestablishment waiting notification is used to instruct the secondary device to wait for completing link reestablishment with the cloud device, the reestablishment waiting notification is sent by the primary device after the primary device determines that the communication status of the cloud device is normal, and that the communication status of the cloud device is normal is determined by the primary device after the primary device determines that no link disconnection timeout occurs between the primary device and the cloud device. In this embodiment of this application, if the link disconnection timeout occurs between the secondary device and the cloud device, but no link disconnection timeout occurs between the primary device and the cloud device, the primary device may determine that the communication status of the cloud device is normal. In this case, the primary device may instruct the secondary device to complete link reestablishment with the cloud device such that the secondary device backs up data from the cloud device after the link reestablishment succeeds.

In a possible design of this application, the method further includes sending, by the secondary device, a second query message to the primary device after determining that a link disconnection timeout occurs between the secondary device and the cloud device, where the second query message is used to query whether a link disconnection timeout occurs between the primary device and the cloud device, and if receiving a third response message returned by the primary device, learning, by the secondary device based on the third response message, that the communication status of the cloud device is abnormal, and starting a local backup mechanism between the primary device and the secondary device, where the third response message is used to notify that a link disconnection timeout occurs between the primary device and the cloud device, and receiving, by the secondary device, second user information sent by the primary device for backup includes after successfully starting the local backup mechanism, receiving, by the secondary device, the second user information sent by the primary device for backup. In this embodiment of this application, if the secondary device first detects that the link disconnection timeout occurs between the secondary device and the cloud device, the secondary device queries whether the link disconnection timeout also occurs between the primary device and the cloud device, and if the link disconnection timeout occurs between the primary device and the cloud device and the link disconnection timeout also occurs between the secondary device and the cloud device, the primary device may determine that the communication status of the cloud device is abnormal. In this case, the primary device may notify the secondary device of this case. After receiving the notification, the secondary device may start the local backup mechanism and perform local backup.

In a possible design of this application, the method further includes, if receiving a fourth response message returned by the primary device, waiting for, by the secondary device, completing link reestablishment with the cloud device, where the fourth response message is used to notify that no link disconnection timeout occurs between the primary device and the cloud device. In this embodiment of this application, if the link disconnection timeout occurs between the secondary device and the cloud device, but no link disconnection timeout occurs between the primary device and the cloud device, the primary device may determine that the communication status of the cloud device is normal. In this case, the primary device may instruct the secondary device to complete link reestablishment with the cloud device such that the secondary device backs up data from the cloud device after the link reestablishment succeeds.

In a possible design of this application, the method further includes, if receiving a second notification message sent by the primary device, making, by the secondary device, a response to the second notification message, where the second notification message is sent by the primary device after the primary device detects that a link disconnection timeout occurs between the primary device and the cloud device, the second notification message is used to notify the secondary device that the link disconnection timeout occurs between the primary device and the cloud device, and the response of the secondary device to the second notification message is used by the primary device to determine the communication status of the cloud device. In this embodiment of this application, if the primary device first detects that the link disconnection timeout occurs between the primary device and the cloud device, the primary device may notify the secondary device of this case such that the primary device may determine, based on a response result of the secondary device specific to the notification, whether the communication status of the cloud device is abnormal.

In a possible design of this application, making, by the secondary device, a response to the second notification message includes starting, by the secondary device, a local backup mechanism between the primary device and the secondary device such that after the local backup mechanism is started, the primary device determines that the communication status of the cloud device is abnormal, and receiving, by the secondary device, second user information sent by the primary device for backup includes after successfully starting the local backup mechanism, receiving, by the secondary device, the second user information sent by the primary device for backup. In this embodiment of this application, if the link disconnection timeout occurs between the primary device and the cloud device and a link disconnection timeout also occurs between the secondary device and the cloud device, the secondary device starts the local backup mechanism. In this case, the primary device may determine that the communication status of the cloud device is abnormal in order to perform local backup.

In a possible design of this application, making, by the secondary device, a response to the second notification message includes returning, by the secondary device, a notification response message to the primary device, where the notification response message is used to instruct the primary device to wait for completing link reestablishment with the cloud device such that the primary device sends obtained third user information to the cloud device in batches after the link reestablishment succeeds, the third user information is stored by the cloud device and provided to the secondary device, and the third user information is to-be-backed-up information of user equipment that gets online from the primary device after a link disconnection occurs between the primary device and the cloud device and before the link reestablishment succeeds. In this embodiment of this application, if the link disconnection timeout occurs between the primary device and the cloud device, but no link disconnection timeout occurs between the secondary device and the cloud device, the primary device may complete link reestablishment with the cloud device, and implement cloud backup after the link reestablishment succeeds.

In a possible design of this application, the method further includes starting, by the secondary device, a local backup mechanism between the primary device and the secondary device if determining that quality of a link between the secondary device and the cloud device is lower than a preset quality threshold and/or determining that quality of a link between the primary device and the cloud device is lower than a preset quality threshold such that after the local backup mechanism is started, the primary device determines that the communication status of the cloud device is abnormal. In this embodiment of this application, when determining that the quality of the link between the cloud device and one of the secondary device and the primary device is low, the secondary device may start the local backup mechanism, and after the local backup mechanism is started, the primary device may determine that the communication status of the cloud device is abnormal. In this case, the primary device may perform local backup.

In a possible design of this application, the method further includes switching, by the secondary device, the secondary device identity of the secondary device to a primary device identity when determining that the secondary device and the cloud device can normally communicate with each other and that the secondary device and the primary device cannot normally communicate with each other. In this embodiment of this application, when the primary device can communicate with neither the cloud device nor the secondary device, if the secondary device can communicate with the cloud device, it indicates that the secondary device may perform cloud backup. In this case, the secondary device may perform primary-secondary identity switching such that the secondary device serves as a primary device to perform cloud backup in order to ensure backup reliability.

In a possible design of this application, that the secondary device and the primary device cannot normally communicate with each other includes a link disconnection timeout occurs between the secondary device and the primary device, or quality of a link between the secondary device and the primary device is lower than a preset quality threshold. In this embodiment of this application, that the secondary device and the primary device cannot normally communicate with each other may be manifested as the link disconnection timeout or the low link quality.

According to a fourth aspect, an embodiment of this application provides a primary device, where the primary device includes a notification sending module configured to send a first identity notification to a cloud device, where the first identity notification is a notification indicating that the primary device has a primary device identity, a status determining module configured to determine a communication status of the cloud device, and a cloud backup module configured to upload obtained first user information to the cloud device when it is determined that the communication status of the cloud device is normal, where the first user information is stored by the cloud device and provided to a secondary device, and the first user information is to-be-backed-up information of user equipment that gets online from the primary device when the communication status of the cloud device is normal.

In a possible design of this application, the primary device further includes a local backup module configured to, when it is determined that the communication status of the cloud device is abnormal and that the primary device and the secondary device can normally communicate with each other, send obtained second user information to the secondary device for backup, where the second user information is to-be-backed-up information of user equipment that gets online from the primary device when the communication status of the cloud device is abnormal.

In a possible design of this application, the status determining module includes a query sending submodule configured to send a first query message to the secondary device after it is detected that a link disconnection timeout occurs between the primary device and the cloud device, where the first query message is used to query whether a link disconnection timeout occurs between the secondary device and the cloud device, and a first determining submodule configured to determine the communication status of the cloud device based on a response message received from the secondary device.

In a possible design of this application, the first determining submodule is further configured to, if a first response message returned by the secondary device is received, determine that the communication status of the cloud device is abnormal, where the first response message is used to notify that a link disconnection timeout occurs between the secondary device and the cloud device, and the local backup module is further configured to start a local backup mechanism between the primary device and the secondary device before sending the obtained second user information to the secondary device for backup.

In a possible design of this application, the first determining submodule is further configured to, if a second response message returned by the secondary device is received, determine that the communication status of the cloud device is normal, where the second response message is used to notify that no link disconnection timeout occurs between the secondary device and the cloud device, and the primary device further includes a first link reestablishment module configured to perform link reestablishment between the primary device and the cloud device, and a first batch backup module configured to send obtained third user information to the cloud device in batches after the link reestablishment succeeds, where the third user information is stored by the cloud device and provided to the secondary device, and the third user information is to-be-backed-up information of user equipment that gets online from the primary device after a link disconnection occurs between the primary device and the cloud device and before the link reestablishment succeeds.

In a possible design of this application, the status determining module includes a notification receiving submodule configured to receive a first notification message sent by the secondary device, where the first notification message is used to notify that a link disconnection timeout occurs between the secondary device and the cloud device, and a second determining submodule configured to determine the communication status of the cloud device based on a link status between the primary device and the cloud device after the first notification message is received.

In a possible design of this application, the second determining submodule is further configured to, if determining that a link disconnection timeout occurs between the primary device and the cloud device, determine that the communication status of the cloud device is abnormal, and the local backup module is further configured to start a local backup mechanism between the primary device and the secondary device before sending the obtained second user information to the secondary device for backup.

In a possible design of this application, the second determining submodule is further configured to, if determining that no link disconnection timeout occurs between the primary device and the cloud device, determine that the communication status of the cloud device is normal, and the primary device further includes a reestablishment notification module configured to instruct the secondary device to wait for completing link reestablishment with the cloud device.

In a possible design of this application, the status determining module includes a query receiving submodule configured to receive a second query message sent by the secondary device, where the second query message is sent by the secondary device after the secondary device determines that a link disconnection timeout occurs between the secondary device and the cloud device, and the second query message is used to query whether a link disconnection timeout occurs between the primary device and the cloud device, and a third determining submodule configured to determine the communication status of the cloud device based on a link status between the primary device and the cloud device after the second query message is received.

In a possible design of this application, the third determining submodule is further configured to, if determining that a link disconnection timeout occurs between the primary device and the cloud device, determine that the communication status of the cloud device is abnormal, and the primary device further includes a first response sending module configured to send a third response message to the secondary device after the local backup module sends the obtained second user information to the secondary device for backup such that the secondary device starts a local backup mechanism between the primary device and the secondary device after receiving the third response message, where the third response message indicates that the link disconnection timeout occurs between the primary device and the cloud device.

In a possible design of this application, the third determining submodule is further configured to, if determining that no link disconnection timeout occurs between the primary device and the cloud device, determine that the communication status of the cloud device is normal, and the primary device further includes a second response sending module configured to send a fourth response message to the secondary device such that after receiving the fourth response message, the secondary device waits for completing link reestablishment with the cloud device, where the fourth response message indicates that no link disconnection timeout occurs between the primary device and the cloud device.

In a possible design of this application, the status determining module includes a notification sending submodule configured to send a second notification message to the secondary device after it is detected that a link disconnection timeout occurs between the primary device and the cloud device, where the second notification message is used to notify the secondary device that the link disconnection timeout occurs between the primary device and the cloud device, and a fourth determining submodule configured to determine the communication status of the cloud device based on a response of the secondary device to the second notification message.

In a possible design of this application, the fourth determining submodule is further configured to, if determining that the secondary device has started a local backup mechanism between the primary device and the secondary device, determine that the communication status of the cloud device is abnormal.

In a possible design of this application, the fourth determining submodule is further configured to, if a notification response message returned by the secondary device is received, determine that the communication status of the cloud device is normal, where the notification response message is used to instruct the primary device to wait for completing link reestablishment with the cloud device, and the primary device further includes a second link reestablishment module configured to perform link reestablishment between the primary device and the cloud device, and a second batch backup module configured to send obtained third user information to the cloud device in batches after the link reestablishment succeeds, where the third user information is stored by the cloud device and provided to the secondary device, and the third user information is to-be-backed-up information of user equipment that gets online from the primary device after a link disconnection occurs between the primary device and the cloud device and before the link reestablishment succeeds.

In a possible design of this application, the status determining module is further configured to, if determining that quality of a link between the primary device and the cloud device is lower than a preset quality threshold and/or determining that quality of a link between the secondary device and the cloud device is lower than a preset quality threshold, determine that the communication status of the cloud device is abnormal.

In a possible design of this application, the primary device further includes an identity switching module configured to switch the primary device identity of the primary device to a secondary device identity when it is determined that the primary device and the cloud device cannot normally communicate with each other and that the primary device and the secondary device cannot normally communicate with each other.

In a possible design of this application, that the primary device and the cloud device cannot normally communicate with each other includes the link disconnection timeout occurs between the primary device and the cloud device, or the quality of the link between the primary device and the cloud device is lower than the preset quality threshold.

In a possible design of this application, that the primary device and the secondary device cannot normally communicate with each other includes a link disconnection timeout occurs between the primary device and the secondary device, or quality of a link between the primary device and the secondary device is lower than a preset quality threshold.

According to a fifth aspect, an embodiment of this application provides a cloud device, where the cloud device includes a notification receiving module configured to receive a first identity notification sent by a primary device and a second identity notification sent by a secondary device, where the first identity notification is a notification indicating that the primary device has a primary device identity, and the second identity notification is a notification indicating that the secondary device has a secondary device identity, and a cloud backup module configured to receive and store first user information uploaded by the primary device, and provide the first user information to the secondary device, where the first user information is uploaded by the primary device when the primary device determines that a communication status of the cloud device is normal, and the first user information is to-be-backed-up information of user equipment that gets online from the primary device when the communication status of the cloud device is normal.

According to a sixth aspect, an embodiment of this application provides a secondary device, where the secondary device includes a notification sending module configured to send a second identity notification to a cloud device, where the second identity notification is a notification indicating that the secondary device has a secondary device identity, and a cloud backup module configured to obtain first user information from the cloud device for backup, where the first user information is uploaded by the primary device to the cloud device for storage when the primary device determines that a communication status of the cloud device is normal, and the first user information is to-be-backed-up information of user equipment that gets online from the primary device when the communication status of the cloud device is normal.

In a possible design of this application, the secondary device further includes a local backup module configured to, when the communication status of the cloud device is abnormal, receive second user information sent by the primary device for backup, where the second user information is to-be-backed-up information of user equipment that gets online from the primary device when the communication status of the cloud device is abnormal, and the second user information is sent by the primary device when the primary device determines that the communication status of the cloud device is abnormal and that the primary device and the secondary device can normally communicate with each other.

In a possible design of this application, the secondary device further includes a message returning module configured to return a response message to the primary device if a first query message sent by the primary device is received, where the first query message is sent by the primary device after the primary device detects that a link disconnection timeout occurs between the primary device and the cloud device, the first query message is used to query whether a link disconnection timeout occurs between the secondary device and the cloud device, and the response message returned by the secondary device is used by the primary device to determine the communication status of the cloud device.

In a possible design of this application, the message returning module is further configured to return a first response message to the primary device, where the first response message is used to notify that a link disconnection timeout occurs between the secondary device and the cloud device such that after learning that the link disconnection timeout occurs between the secondary device and the cloud device, the primary device determines that the communication status of the cloud device is abnormal, and starts a local backup mechanism between the primary device and the secondary device after determining that the communication status of the cloud device is abnormal, and the local backup module is further configured to receive the second user information sent by the primary device after the primary device starts the local backup mechanism and used for backup.

In a possible design of this application, the message returning module is further configured to return a second response message to the primary device, where the second response message is used to notify that no link disconnection timeout occurs between the secondary device and the cloud device such that after learning that no link disconnection timeout occurs between the secondary device and the cloud device, the primary device determines that the communication status of the cloud device is normal, performs link reestablishment with the cloud device after determining that the communication status of the cloud device is normal, and sends obtained third user information to the cloud device in batches after the link reestablishment succeeds, where the third user information is stored by the cloud device and provided to the secondary device, and the third user information is to-be-backed-up information of user equipment that gets online from the primary device after a link disconnection occurs between the primary device and the cloud device and before the link reestablishment succeeds.

In a possible design of this application, the secondary device further includes a notification sending module configured to send a first notification message to the primary device, where the first notification message is used to notify that a link disconnection timeout occurs between the secondary device and the cloud device such that after learning that a link disconnection timeout occurs between the secondary device and the cloud device, the primary device determines that the communication status of the cloud device is abnormal.

In a possible design of this application, the secondary device further includes a notification receiving module configured to receive a reestablishment waiting notification sent by the primary device, where the reestablishment waiting notification is used to instruct the secondary device to wait for completing link reestablishment with the cloud device, the reestablishment waiting notification is sent by the primary device after the primary device determines that the communication status of the cloud device is normal, and that the communication status of the cloud device is normal is determined by the primary device after the primary device determines that no link disconnection timeout occurs between the primary device and the cloud device.

In a possible design of this application, the secondary device further includes a query sending module configured to send a second query message to the primary device after it is determined that a link disconnection timeout occurs between the secondary device and the cloud device, where the second query message is used to query whether a link disconnection timeout occurs between the primary device and the cloud device, and the local backup module is further configured to, if a third response message returned by the primary device is received, learn, based on the third response message, that the communication status of the cloud device is abnormal, start a local backup mechanism between the primary device and the secondary device, and after successfully starting the local backup mechanism, receive the second user information sent by the primary device for backup, where the third response message is used to notify that a link disconnection timeout occurs between the primary device and the cloud device.

In a possible design of this application, the secondary device further includes a link reestablishment module configured to, if a fourth response message returned by the primary device is received, complete link reestablishment between the secondary device and the cloud device, where the fourth response message is used to notify that no link disconnection timeout occurs between the primary device and the cloud device.

In a possible design of this application, the secondary device further includes a notification responding module configured to, if a second notification message sent by the primary device is received, make a response to the second notification message, where the second notification message is sent by the primary device after the primary device detects that a link disconnection timeout occurs between the primary device and the cloud device, the second notification message is used to notify the secondary device that the link disconnection timeout occurs between the primary device and the cloud device, and the response of the secondary device to the second notification message is used by the primary device to determine the communication status of the cloud device.

In a possible design of this application, the notification responding module is further configured to start a local backup mechanism between the primary device and the secondary device such that after the local backup mechanism is started, the primary device determines that the communication status of the cloud device is abnormal, and the local backup module is further configured to, after the local backup mechanism is successfully started, receive the second user information sent by the primary device for backup.

In a possible design of this application, the notification responding module is further configured to return a notification response message to the primary device, where the notification response message is used to instruct the primary device to wait for completing link reestablishment with the cloud device such that the primary device sends obtained third user information to the cloud device in batches after the link reestablishment succeeds, the third user information is stored by the cloud device and provided to the secondary device, and the third user information is to-be-backed-up information of user equipment that gets online from the primary device after a link disconnection occurs between the primary device and the cloud device and before the link reestablishment succeeds.

In a possible design of this application, the local backup module is further configured to start a local backup mechanism between the primary device and the secondary device if it is determined that quality of a link between the secondary device and the cloud device is lower than a preset quality threshold and/or it is determined that quality of a link between the primary device and the cloud device is lower than a preset quality threshold such that after the local backup mechanism is started, the primary device determines that the communication status of the cloud device is abnormal.

In a possible design of this application, the secondary device further includes an identity switching module configured to switch the secondary device identity of the secondary device to a primary device identity when it is determined that the secondary device and the cloud device can normally communicate with each other and that the secondary device and the primary device cannot normally communicate with each other.

In a possible design of this application, that the secondary device and the primary device cannot normally communicate with each other includes a link disconnection timeout occurs between the secondary device and the primary device, or quality of a link between the secondary device and the primary device is lower than a preset quality threshold.

According to a seventh aspect, an embodiment of this application further provides a primary device, and the primary device includes a processor, a memory, a communications interface, and a bus. The processor, the communications interface, and the memory communicate with each another using the bus, the communications interface is configured to receive and send data, the memory is configured to store an instruction, and the processor is configured to execute the instruction in the memory, to perform the method in any item of the first aspect.

According to an eighth aspect, an embodiment of this application further provides a cloud device, and the cloud device includes a processor, a memory, a communications interface, and a bus. The processor, the communications interface, and the memory communicate with each other using the bus, the communications interface is configured to receive and send data, the memory is configured to store an instruction, and the processor is configured to execute the instruction in the memory, to perform the method in any item of the second aspect.

According to a ninth aspect, an embodiment of this application further provides a secondary device, and the secondary device includes a processor, a memory, a communications interface, and a bus. The processor, the communications interface, and the memory communicate with each other using the bus, the communications interface is configured to receive and send data, the memory is configured to store an instruction, and the processor is configured to execute the instruction in the memory, to perform the method in any item of the third aspect.

According to a tenth aspect, an embodiment of this application provides a communications system, where the communications system includes the primary device according to the fourth aspect, the cloud device according to the fifth device, and the secondary device according to the sixth aspect, or the communications system includes the primary device according to the seventh aspect, the cloud device according to the eighth device, and the secondary device according to the ninth aspect.

According to an eleventh aspect, an embodiment of this application provides a computer-readable storage medium. The computer-readable storage medium stores an instruction, and when the instruction is run on a computer, the computer is enabled to perform the methods according to the aspects.

According to a twelfth aspect, an embodiment of this application further provides a computer program product including an instruction. When the instruction is run on a computer, the computer is enabled to perform the methods described in the foregoing aspects.

DESCRIPTION OF EMBODIMENTS

The embodiments of this application provide an information backup method and a related device, to ensure continuity of a user service.

Figure 1A:
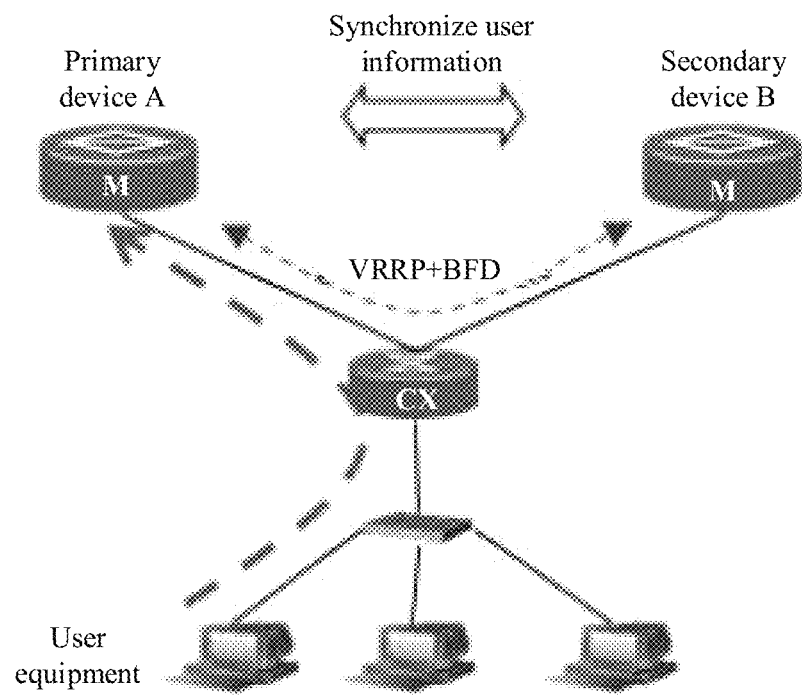
FIG. 1A is a schematic diagram 1 of a data flow direction of a communications system.
Figure 1B:
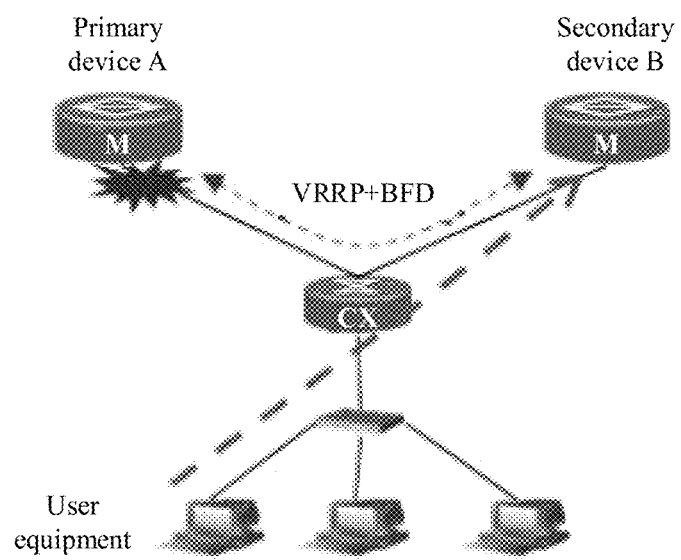
FIG. 1B is a schematic diagram 2 of a data flow direction of a communications system.
Figure 2:
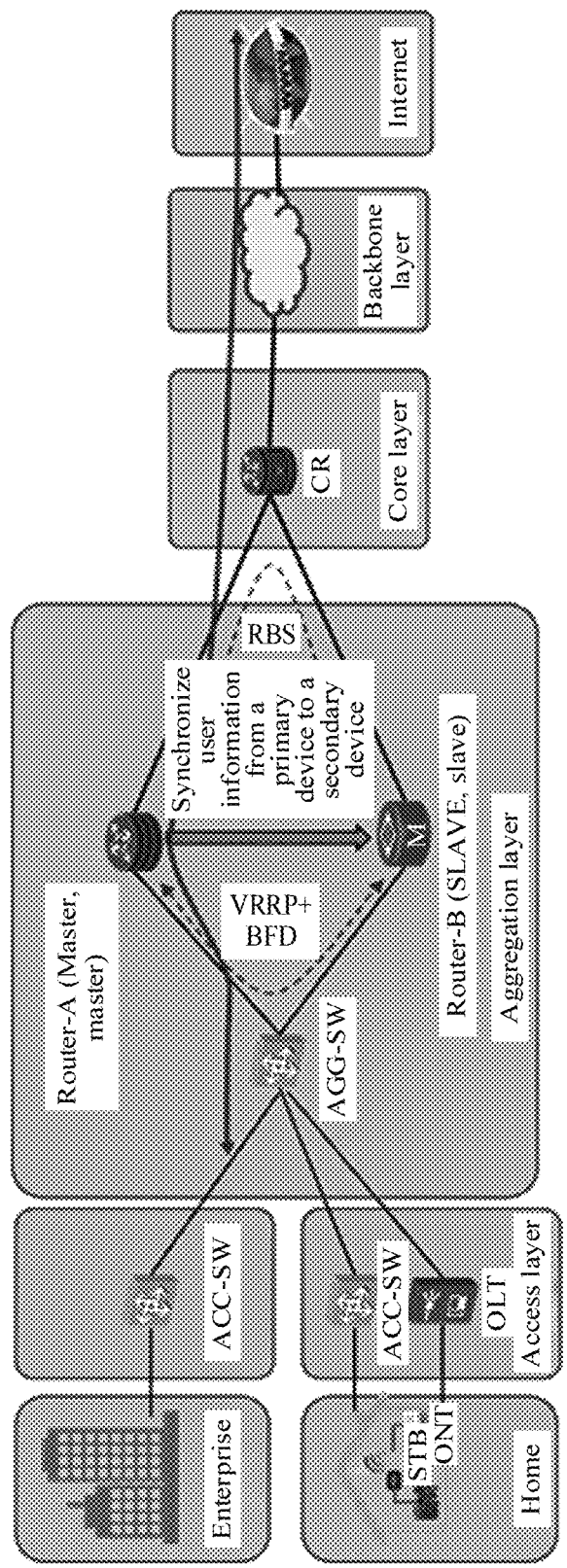
FIG. 2 is a schematic architectural composition diagram of a communications system.

FIG. 2 is a schematic architectural diagram of an RUI multi-server backup communications system according to an embodiment of this application. In the communications system, a router-A and a router-B may be routers, or may be other devices that can implement backup of user information, for example, switches. When it is negotiated according to a primary-secondary protocol that the router-A is a primary device and the router-B is a secondary device, uplink and downlink traffic of user equipment may be forwarded through the router-A, and the router-A may back up information of the user equipment to the router-B through an RBS channel.

Based on a system architecture shown in FIG. 2, an RUI logical model thereof is as follows.

(1) A primary-secondary relationship between routers is negotiated according to a primary-secondary protocol, for example, the VRRP protocol. There may be one primary device and a plurality of secondary devices, but generally, one user service is corresponding to one primary device and one secondary device, to implement backup of user information from the primary device to the secondary device for the user service.

(2) A remote backup profile (RBP) is created to provide a backup manner and a backup direction of user information.

(3) An RBS is created to establish a data channel between a primary device and a secondary device.

(4) The primary-secondary protocol and BFD are jointly deployed to rapidly detect a communication fault between user equipment and the primary device and notify an upper-layer application when a fault occurs.

(5) The primary device advertises an address pool route to a network side, user equipment may obtain an address from an address pool after getting online, and the secondary device withdraws a corresponding address pool route. In this case, traffic between the network side and a user side is forwarded through the primary device. In a fault scenario, for example, a fault occurs on an interface 1 of the primary device, only a user service corresponding to the faulty interface 1 is switched to the secondary device, but the primary device still has another normal interface, for example, an interface 2. Users of the interface 2 and the faulty interface 1 share a same address pool. Therefore, the address pool route advertised by the primary device before occurrence of the fault is not withdrawn, and traffic of the user service corresponding to the faulty interface 1, that is, service traffic between the network side and a user side, may first reach the primary device and then reach the secondary device through an RBS channel for traffic forwarding.

Figure 3:
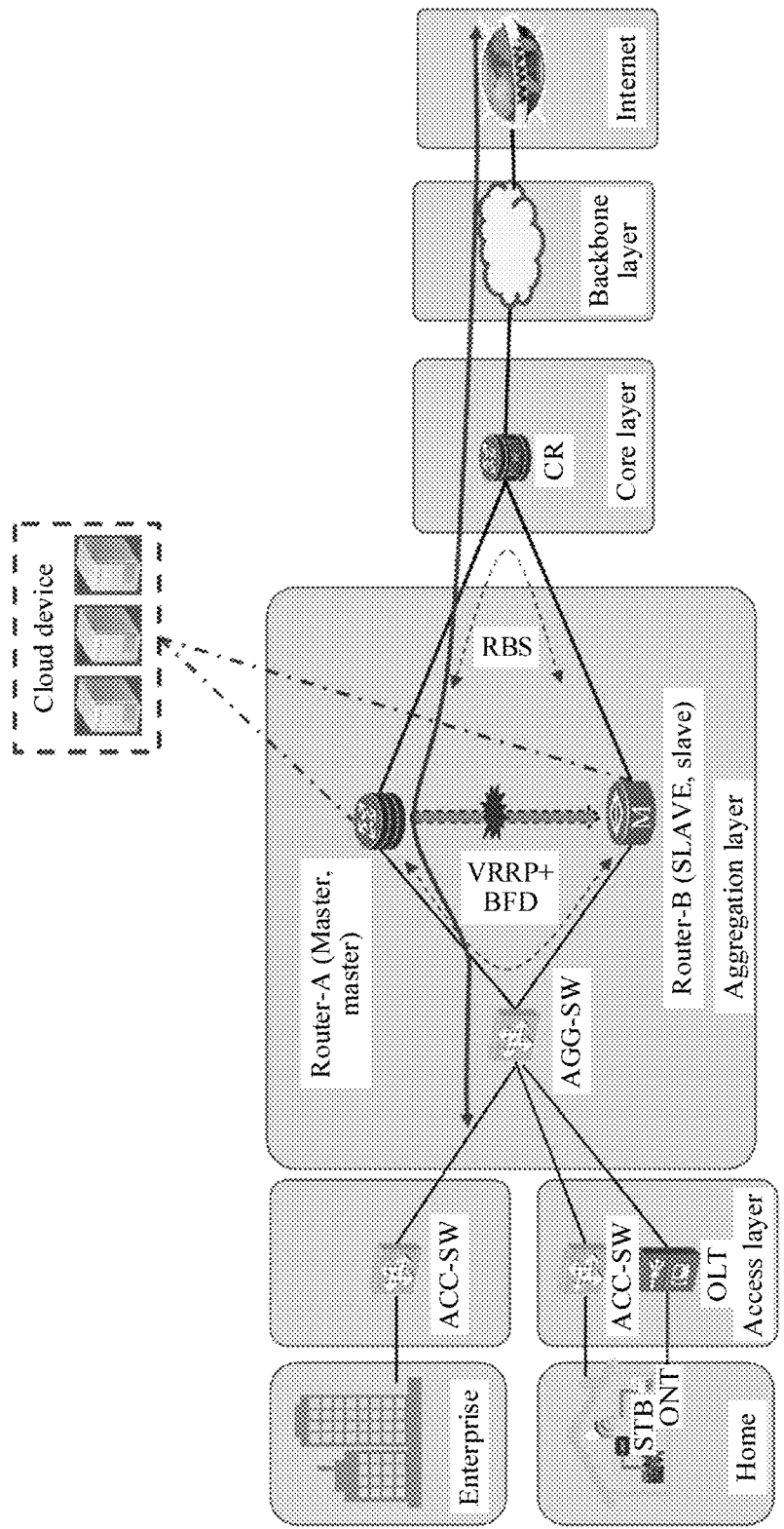
FIG. 3 is a schematic architectural composition diagram of a communications system according to an embodiment of this application.

FIG. 3 is a schematic architectural composition diagram of a communications system according to an embodiment of this application. Based on the communications system shown in FIG. 2, the communications system provided in this embodiment of this application further includes a cloud device. A type of the cloud device is not limited in this embodiment of this application. For example, the cloud device may be a standardized network component (SNC) controller, a server, or a network management device. The router-A and the router-B serve as local branch devices of a cloud backup system, and the cloud device serves as a centralized storage device of the cloud backup system. When serving as a primary device, the router-A is configured to upload user information to the cloud device. When serving as a secondary device, the router-B is configured to obtain the user information from the cloud device for backup. In addition, usually, the router-A does not back up user information to the router-B by default. The router-A can back up user information to the router-B only when communication between the router-A and/or the router-B and the cloud device is abnormal. It should be noted that, for the router-A and the router-B, in terms of traffic forwarding, the router-A is mainly responsible for forwarding traffic, while the router-B is not responsible for forwarding traffic. To be specific, when the router-A serves as a primary device, user equipment gets online from the router-A, and the router-A is responsible for forwarding service traffic between the user equipment and a network side, where for a specific traffic forwarding manner, refer to the other approaches, and details are not repeated herein, while as a secondary device, the router-B is not responsible for forwarding traffic for the user equipment, but needs to back up user information of the user equipment.

The following describes the embodiments of this application with reference to accompanying drawings.

In the specification, claims, and accompanying drawings of this application, the terms "first", "second", and so on are merely intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain" and any other variants mean to cover the non-exclusive inclusion such that a process, method, system, product, or device that includes a series of units is not necessarily limited to those units, but may include other units not expressly listed or inherent to such a process, method, system, product, or device.

The following describes in detail the information backup method and the related device provided in the embodiments of this application.

In some embodiments of this application, to implement cloud backup, the following preparation work 1 and preparation work 2 need to be completed successively.

Preparation Work 1: Negotiate a Primary Device and a Secondary Device According to a Primary-Secondary Protocol.

The following provides description using an example in which negotiation objects in a primary-secondary relationship are routers. When the communications system shown in FIG. 3 includes a plurality of routers, which router is a primary device and which router is a secondary device need to be negotiated according to the primary-secondary protocol such as VRRP. Therefore, VRRP defines three states of a router an initialize state, a master state, and a backup state. VRRP determines a role of each router based on a priority, that is, determines a primary device and a secondary device. A router with a higher priority is more likely to become a primary device.

Further, each router is operating in an initialize state during initial creation of the VRRP. If a priority of a router is lower than 255, the router is switched from the initialize state to a backup state, and then is switched to a master state after a timer expires. A router that is first switched to a master state learns a priority of another router through exchange of a VRRP notification packet, to select a primary device. During selection of a primary device, for each router in a backup state, if a priority of a primary device in a VRRP notification packet is higher than or equal to that of the router, the router still keeps in a backup state, or if a priority of a primary device in a VRRP notification packet is lower than that of the router, when the router uses a preemption mode, the router is switched from a backup state to a master state in order to become a primary device, or when the router uses a non-preemption mode, the router still keeps in a backup state.

Preparation Work 2: Enable a Cloud Device to Learn that the Primary Device has a Primary Device Identity and that the Secondary Device has a Secondary Device Identity.

Figure 4:
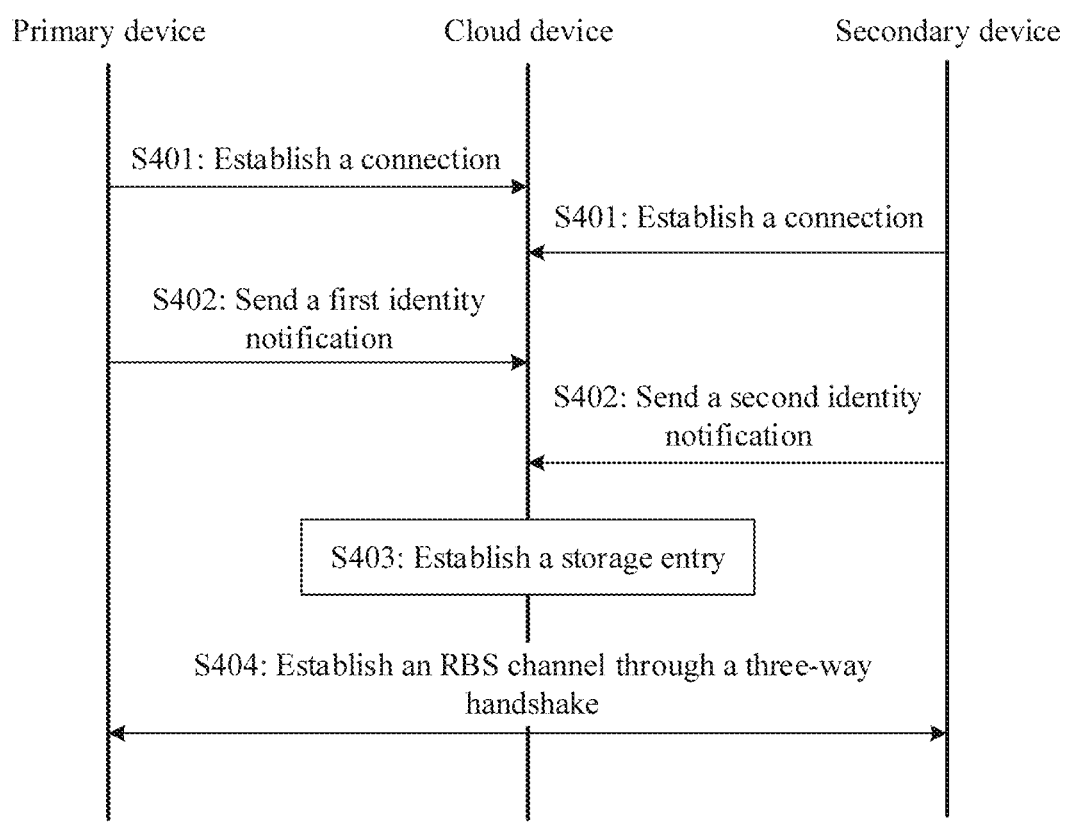
FIG. 4 is a schematic flowchart of data preparation according to an embodiment of this application.

FIG. 4 is a schematic flowchart of a data preparation method, including the following steps.

S401: A primary device establishes a connection to a cloud device, and a secondary device establishes a connection to the cloud device.

After a primary device and a secondary device are negotiated according to a primary-secondary protocol, the primary device and the secondary device each may establish a connection to the cloud device according to the Network Configuration Protocol (NETCONF), the Simple Network Management Protocol (SNMP), or the like.

S402: The primary device sends a first identity notification to the cloud device, where the first identity notification is a notification indicating that the primary device has a primary device identity, and the secondary device sends a second identity notification to the cloud device, where the second identity notification is a notification indicating that the secondary device has a secondary device identity.

For example, the first identity notification may include a unique identifier of the primary device and an identifier of a primary device identity, for example, an IP address of the primary device and "primary". Likewise, the second identity notification may include a unique identifier of the secondary device and an identifier of a secondary device identity, for example, an IP address of the secondary device and "secondary".

S403: The cloud device establishes a storage entry.

After receiving the first identity notification, the cloud device establishes a storage entry for the primary device, for example, an IP address of the primary device: primary. Likewise, after receiving the second identity notification, the cloud device establishes a storage entry for the secondary device, for example, an IP address of the secondary device: secondary.

S404: The primary device and the secondary device establish an RBS channel through a three-way handshake.

In addition, the primary device and the secondary device further need to establish an RBS channel through a three-way handshake, to implement information backup from the primary device to the secondary device through the RBS channel when a local backup mechanism between the primary device and the secondary device is started. A process of the three-way handshake is as follows.

In a first handshake, the primary device sends a synchronous (SYN) packet to the secondary device, and then waits for an acknowledgement of the secondary device, where SYN is a handshake signal used when a Transmission Control Protocol (TCP)/IP connection is established. In a second handshake, when receiving the SYN packet sent by the primary device, the secondary device sends an SYN+ACK packet to the primary device, where ACK is an acknowledgement character. In a third handshake, after receiving the SYN+ACK packet sent by the secondary device, the primary device sends an acknowledgement packet ACK to the secondary device, and after the packet is sent, the primary device and the secondary device enter a TCP connection success state in order to complete the three-way handshake.

After the foregoing preparation work is completed, user information backup may be implemented according to the following embodiments of this application.

Figure 5:
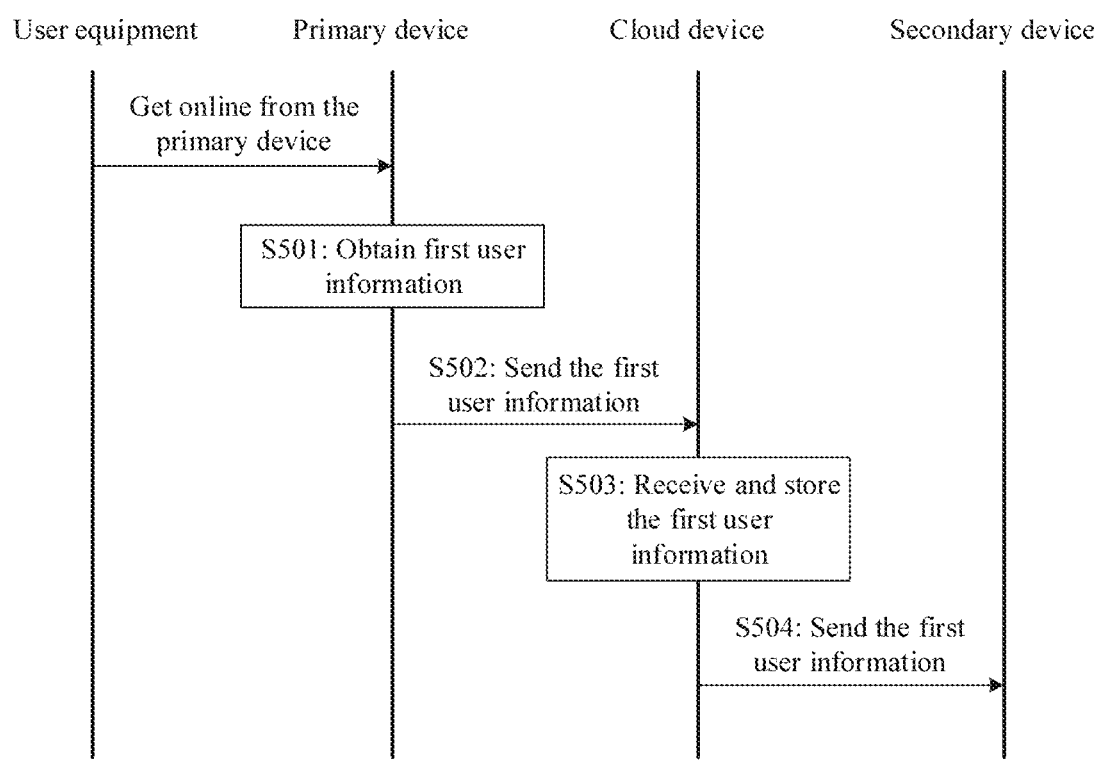
FIG. 5 is a schematic interaction diagram of a normal information backup method according to an embodiment of this application.

FIG. 5 is a schematic interaction diagram of an information backup method according to an embodiment of this application. The information backup method may include the following steps.

S501: A primary device obtains first user information, where the first user information is to-be-backed-up information of user equipment that gets online from the primary device when a communication status of a cloud device is normal.

When the communication status of the cloud device is normal, that is, the primary device can normally communicate with the cloud device and a secondary device can also normally communicate with the cloud device, after user equipment successfully gets online through the primary device, the primary device obtains to-be-backed-up information of the user equipment. The to-be-backed-up information may include a media access control (MAC) address, an IP address, a Dynamic Host Configuration Protocol (DHCP) lease term, DHCP option 82, and the like of the user equipment.

The foregoing provides description using a manner of obtaining to-be-backed-up information when user equipment gets online using the DHCP as an example.

When user equipment needs to get online through the primary device, the user equipment first sends a discovery packet to the primary device, where the discovery packet carries a MAC address of the user equipment. In this way, the primary device obtains the MAC address of the user equipment. Then a server allocates an IP address to the user equipment through the primary device through packet exchange between the user equipment, the primary device, and the server such that the primary device obtains the IP address of the user equipment. The server further configures a DHCP lease term while allocating the IP address to the user equipment such that the primary device obtains the DHCP lease term of the user equipment. For DHCP option 82, the user equipment carries DHCP option 82 when performing dial-up to get online, and the primary device may also regenerate DHCP option 82 according to a principle of the primary device. In this way, the primary device obtains the DHCP option 82 of the user equipment.

S502: The primary device uploads the obtained first user information to the cloud device when determining that the communication status of the cloud device is normal.

After generating the first user information, the primary device backs up the first user information to the cloud device.

In some embodiments of this application, the primary device may upload the first user information to the cloud device in a real-time uploading manner or a batch uploading manner. Further, when the real-time uploading manner is used, after generating the first user information, the primary device immediately uploads the first user information to the cloud device, or when the batch uploading manner is used, all first user information that has not been uploaded is uploaded in batches at a predicted time interval, for example, 1 second.

It should be noted that, after link reestablishment between the primary device and the cloud device is completed, the primary device also backs up user information to the cloud device in batches. For details, refer to step S605a in FIG. 6A and step S707b in FIG. 7B.

In addition, in some other scenarios, batch uploading also needs to be performed. Further, description is provided with reference to FIG. 3. If user equipment gets online through the router-A, and a fault occurs on a communications link 1 between the user equipment and the router-A, a primary-secondary protocol functions, that is, the communications link 1 should be switched from a primary device identity to a secondary device identity, while a communications link 2, corresponding to the communications link 1, of the router-B should be switched from a secondary device identity to a primary device identity in order to ensure continuity of a user service of the user equipment using the communications link 2. However, if the router-A is uploading data in batches to the cloud device using an interface corresponding to the communications link 1, to ensure that backed-up data is not lost, primary-secondary switching is performed after batch uploading ends.

S503: The cloud device receives and stores the first user information.

The cloud device records identity information of the primary device (for example, an IP address of the primary device). Therefore, after receiving the first user information, the cloud device may determine, based on the identity information of the primary device, that the first user information is uploaded by the primary device, and further store the first user information.

S504: The secondary device obtains the first user information from the cloud device for backup.

The cloud device instructs the secondary device to download the first user information, or the cloud device directly delivers the first user information to the secondary device such that the secondary device backs up the user information.

It should be noted that in a normal case, the secondary device does not proactively back up data to the cloud device.

If the secondary device backs up data to the cloud device, the cloud device may discard the data based on a recorded secondary device identity.

It may be understood that, when a fault occurs on a communications link 1 between the user equipment and the primary device, that is, the user equipment cannot forward service traffic to a network side through the primary device, a communications link 2, corresponding to the communications link 1, of the secondary device is switched to a primary device. In this way, the new primary device may continue to perform a user service of the user equipment through the link 2 based on backed-up information of the user equipment in order to ensure continuity of the user service.

In this embodiment of this application, when the communication status of the cloud device is normal, if user equipment gets online from the primary device, the primary device generates to-be-backed-up information of the user equipment and uploads the to-be-backed-up information to the cloud device. In this way, the secondary device can obtain the to-be-backed-up information from the cloud device for backup. It can be learned that in this embodiment of this application, the primary device backs up information to the secondary device using the cloud device. This avoids discontinuity of a user service caused when the primary device directly backs up information to the secondary device.

The foregoing describes a method for implementing data backup using the cloud device when the communication status of the cloud device is normal. However, when the communication status of the cloud device is abnormal, the primary device cannot back up data to the cloud device and/or the secondary device cannot obtain to-be-backed-up data from the cloud device. In this case, if the primary device and the secondary device can normally communicate with each other, a local backup mechanism between the primary device and the secondary device may be started, to implement direct backup from the primary device to the secondary device. The following provides specific description.

In some embodiments of this application, the information backup method provided in this embodiment of this application may further include step S505 The primary device determines the communication status of the cloud device, and the primary device sends obtained second user information to the secondary device for backup when determining that the communication status of the cloud device is abnormal and that the primary device and the secondary device can normally communicate with each other. The second user information is to-be-backed-up information of user equipment that gets online from the primary device when the communication status of the cloud device is abnormal. In this embodiment, when the communication status of the cloud device is abnormal, a local backup mechanism between the primary device and the secondary device is started. In this case, if user equipment gets online from the primary device, the primary device obtains to-be-backed-up information, that is, second user information, of the user equipment and sends the second user information to the secondary device for backup through an RBS channel. It can be learned that, when data backup cannot be implemented using the cloud device, an existing local backup mechanism is used in order to improve backup reliability.

The following describes in detail specific implementations of the foregoing local backup method.

Figure 6A:
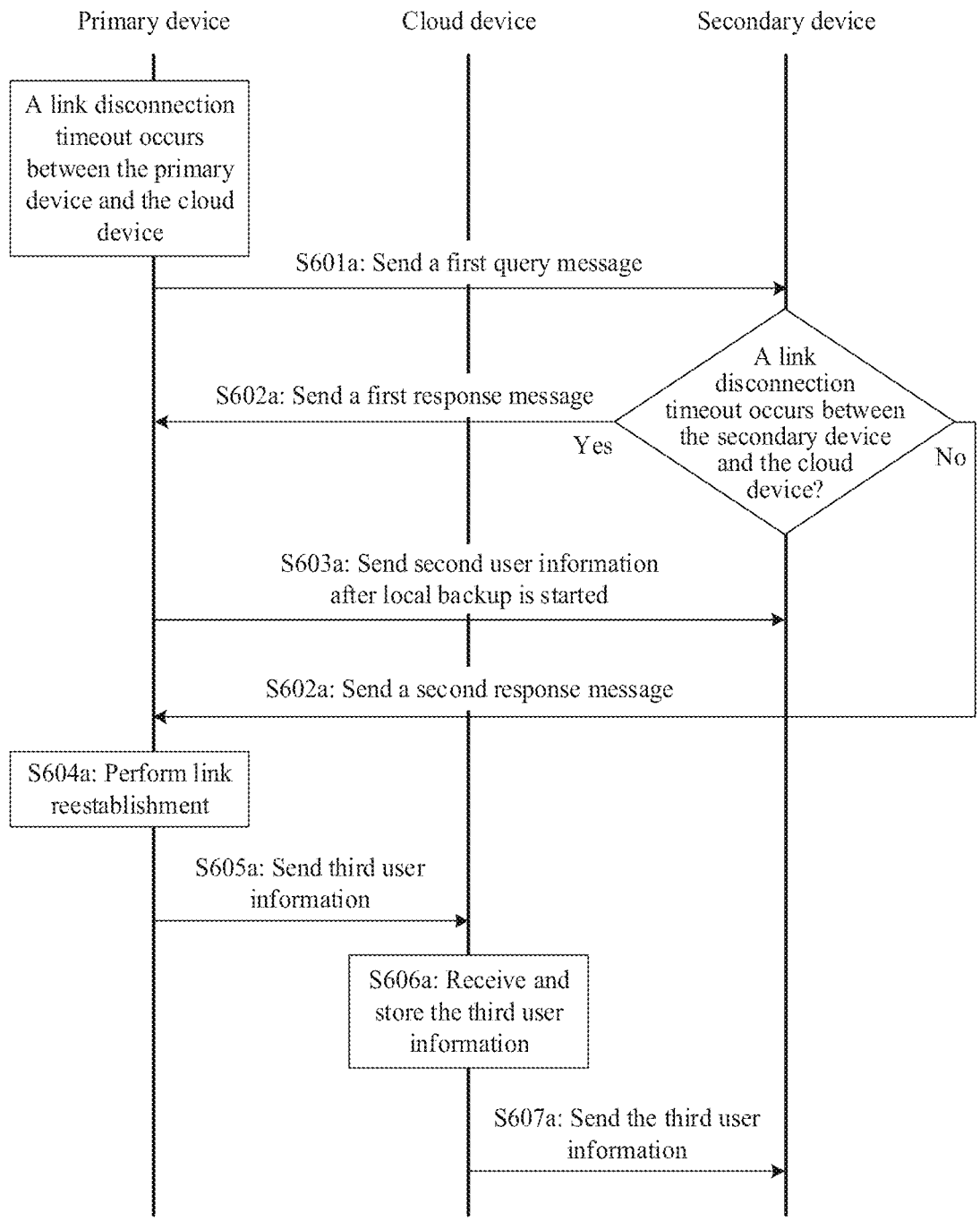
FIG. 6A is a schematic interaction diagram 1 of a local information backup method according to an embodiment of this application.

It should be noted that, for the secondary device, if the primary device first detects that a link disconnection timeout occurs between the primary device and the cloud device, local backup is implemented according to the following process shown in FIG. 6A. Certainly, a primary-secondary protocol may pre-specify a router device that initiates a local backup mechanism. When the primary-secondary protocol specifies that a primary device is responsible for initiating a local backup mechanism, if the primary device first detects that a link disconnection timeout occurs between the primary device and the cloud device, local backup is implemented according to the following process shown in FIG. 6A. On the contrary, if the secondary device first detects that a link disconnection timeout occurs between the secondary device and the cloud device, local backup is implemented according to the following process shown in FIG. 6B. Details are as follows.

FIG. 6A is a schematic interaction diagram of a method for local backup of user information. The local backup method may include the following steps.

S601a: A primary device sends a first query message to a secondary device if detecting that a link disconnection timeout occurs between the primary device and a cloud device and determining that the primary device and the secondary device can normally communicate with each other, where the first query message is used to query whether a link disconnection timeout occurs between the secondary device and the cloud device.

For the secondary device, if the primary device first detects that the link disconnection timeout occurs between the primary device and the cloud device, the primary device queries whether a link disconnection timeout also occurs between the secondary device and the cloud device.

Then the primary device may determine a communication status of the cloud device based on a response message received from the secondary device, that is, determine whether the communication status of the cloud device is normal or abnormal. The communication status of the cloud device may be determined according to the following steps.

S602a: After receiving a first query message, the secondary device detects whether a link disconnection timeout occurs between the secondary device and the cloud device, and if a link disconnection timeout occurs, the secondary device returns a first response message to the primary device, where the first response message notifies that the link disconnection timeout occurs between the secondary device and the cloud device, or if no link disconnection timeout occurs link disconnection timeout occurs, the secondary device returns a second response message to the primary device, where the second response message is used to notify that no link disconnection timeout occurs between the secondary device and the cloud device.

S603a: If receiving the first response message returned by the secondary device, the primary device determines that a communication status of the cloud device is abnormal, starts a local backup mechanism between the primary device and the secondary device, and sends second user information to the secondary device for backup after successfully starting the local backup mechanism.

After receiving the first response message and when determining that the link disconnection timeout occurs between the primary device and the cloud device and that the link disconnection timeout occurs between the secondary device and the cloud device, the primary device determines that a fault occurs on the cloud device. In this case, the primary device cannot back up data to the cloud device, and the secondary device cannot obtain to-be-backed-up data from the cloud device either.

In this case, the primary device initiates a three-way handshake with the secondary device, to start the local backup mechanism between the primary device and the secondary device. The primary device directly backs up the second user information to the secondary device after successfully starting the local backup mechanism. In addition, the primary device no longer sends to-be-backed-up data to the cloud device, and the secondary device no longer obtains to-be-backed-up data from the cloud device. For a specific process of the three-way handshake, refer to related description in S404, and details are not repeated herein.

S604a: If receiving the second response message returned by the secondary device, the primary device determines that a communication status of the cloud device is normal, and performs link reestablishment with the cloud device.

After receiving the second response message, the primary device determines that a short link disconnection occurs only between the primary device and the cloud device. In this case, the primary device may perform link reestablishment with the cloud device, to restore a connection to the cloud device.

S605a: After the link reestablishment between the primary device and the cloud device succeeds, the primary device sends obtained third user information to the cloud device in batches for backup.

After a link disconnection occurs between the primary device and the cloud device and before the link reestablishment between the primary device and the cloud device succeeds, one or more user equipments may have got online from the primary device. In this embodiment, to-be-backed-up information of each user equipment is defined as third user information. Therefore, after the link reestablishment succeeds, the primary device may upload the third user information to the cloud device in batches, to ensure that the secondary device can back up the third user information from the cloud device in a timely manner.

S606a: The cloud device receives and stores the third user information.

The cloud device records identity information of the primary device (for example, an IP address of the primary device). Therefore, after receiving the third user information, the cloud device may determine, based on the identity information of the primary device, that the third user information is uploaded by the primary device, and further store the third user information.

S607a: The secondary device obtains the third user information from the cloud device for backup.

Then the cloud device instructs the secondary device to download the third user information, or the cloud device directly delivers the third user information to the secondary device in order to implement backup of the user information.

Figure 6B:
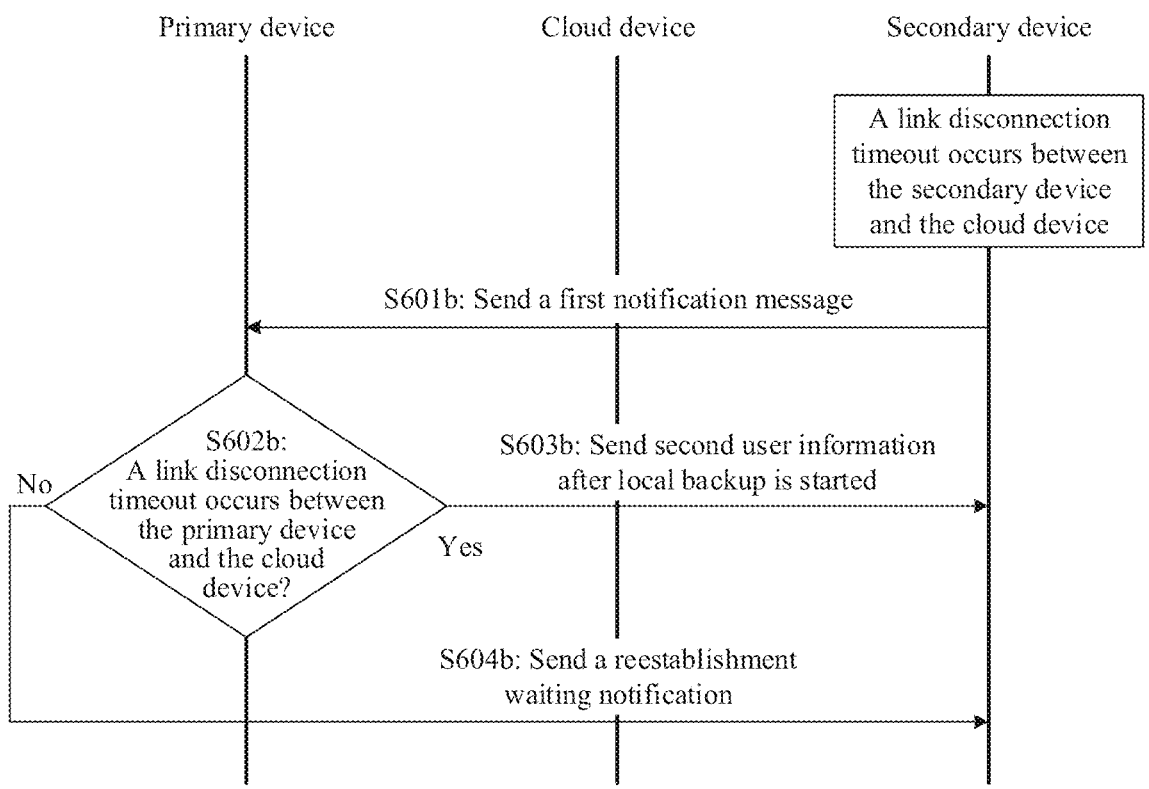
FIG. 6B is a schematic interaction diagram 2 of a local information backup method according to an embodiment of this application.

FIG. 6B is a schematic interaction diagram of a method for local backup of user information. The local backup method may include the following steps.

S601b: A secondary device sends a first notification message to a primary device if detecting that a link disconnection timeout occurs between the secondary device and a cloud device and determining that the secondary device and the primary device can normally communicate with each other, where the first notification message is used to notify that the link disconnection timeout occurs between the secondary device and the cloud device.

For the primary device, if the secondary device first detects that the link disconnection timeout occurs between the secondary device and the cloud device, the secondary device notifies the primary device that the link disconnection timeout occurs between the secondary device and the cloud device, and after receiving the first notification message, the primary device may determine a communication status of the cloud device based on a link status between the primary device and the cloud device, that is, determine whether the communication status of the cloud device is normal or abnormal. The communication status of the cloud device may be determined according to the following steps.

S602b: After receiving the first notification message, the primary device determines whether a link disconnection timeout occurs between the primary device and the cloud device, and if a link disconnection timeout occurs, the primary device determines that a communication status of the cloud device is abnormal, and performs S603b, or if no link disconnection timeout occurs, the primary device determines that a communication status of the cloud device is normal, and performs S604b.

If the link disconnection timeout also occurs between the primary device and the cloud device, the primary device cannot back up data to the cloud device, and the secondary device cannot obtain to-be-backed-up data from the cloud device either. Therefore, the primary device determines that a fault occurs on the cloud device.

S603b: The primary device starts a local backup mechanism between the primary device and the secondary device, and sends second user information to the secondary device for backup after successfully starting the local backup mechanism.

The primary device initiates a three-way handshake with the secondary device after determining that a fault occurs on the cloud device, to start the local backup mechanism between the primary device and the secondary device. The primary device directly backs up the second user information to the secondary device after successfully starting the local backup mechanism. In addition, the primary device no longer sends to-be-backed-up data to the cloud device, and the secondary device no longer obtains to-be-backed-up data from the cloud device. For a specific process of the three-way handshake, refer to related description in S404, and details are not repeated herein.

S604b: The primary device sends a reestablishment waiting notification to the secondary device, where the reestablishment waiting notification is used to instruct the secondary device to wait for completing link reestablishment with the cloud device.

If no link disconnection timeout occurs between the primary device and the cloud device, that is, a short disconnection occurs only between the secondary device and the cloud device, the primary device instructs the secondary device to wait for completing link reestablishment with the cloud device. After receiving the notification, the secondary device temporarily stops obtaining to-be-backed-up data from the cloud device, but obtains to-be-backed-up data from the cloud device after a connection between the secondary device and the cloud device is restored.

It can be learned from the local backup processes shown in FIG. 6A and FIG. 6B that, if the link disconnection timeout occurs between the primary device and the cloud device and the link disconnection timeout occurs between the secondary device and the cloud device, that is, the primary device cannot back up data to the cloud device, and the secondary device cannot obtain to-be-backed-up data from the cloud device either, it indicates that a fault may have occurred on the cloud device. In this case, a backup mechanism based on the cloud device needs to be switched to a local backup mechanism between the primary device and the secondary device. This can ensure that information of a user that gets online from the primary device can be backed up on the secondary device side in a timely manner. In this way, once a fault occurs on a communications link between user equipment and the primary device, the secondary device may take over work of the primary device in a timely manner in order to ensure continuity of a user service. In addition, if a link disconnection occurs only between the cloud device and one of the primary device and the secondary device, it indicates that no fault occurs on the cloud device. Usually, a connection can be restored rapidly from the short link disconnection. Therefore, a party that encounters a link disconnection may perform data backup using the cloud device after connection restoration.

However, to avoid a case in which a connection of a party that encounters a link disconnection cannot be restored rapidly, in another implementation, the primary device directly initiates a local backup mechanism provided that the link disconnection timeout occurs between the cloud device and one of the primary device and the secondary device but the primary device and the secondary device can normally communicate with each other, and sends to-be-backed-up information to the secondary device for backup after successfully initiating the local backup mechanism. To be specific, in FIG. 6A, when the link disconnection timeout occurs between the primary device and the cloud device, S603a is directly performed, and other steps are not performed, in FIG. 6B, when the link disconnection timeout occurs between the secondary device and the cloud device, S601b and S603b are successively performed, and other steps are not performed.

It should be noted that, in the foregoing embodiments shown in FIG. 6A and FIG. 6B, the primary device starts the local backup mechanism, while in the following embodiments shown in FIG. 7A and FIG. 7B, a secondary device starts a local backup mechanism. The following describes in detail the embodiments shown in FIG. 7A and FIG. 7B.

Figure 7A:
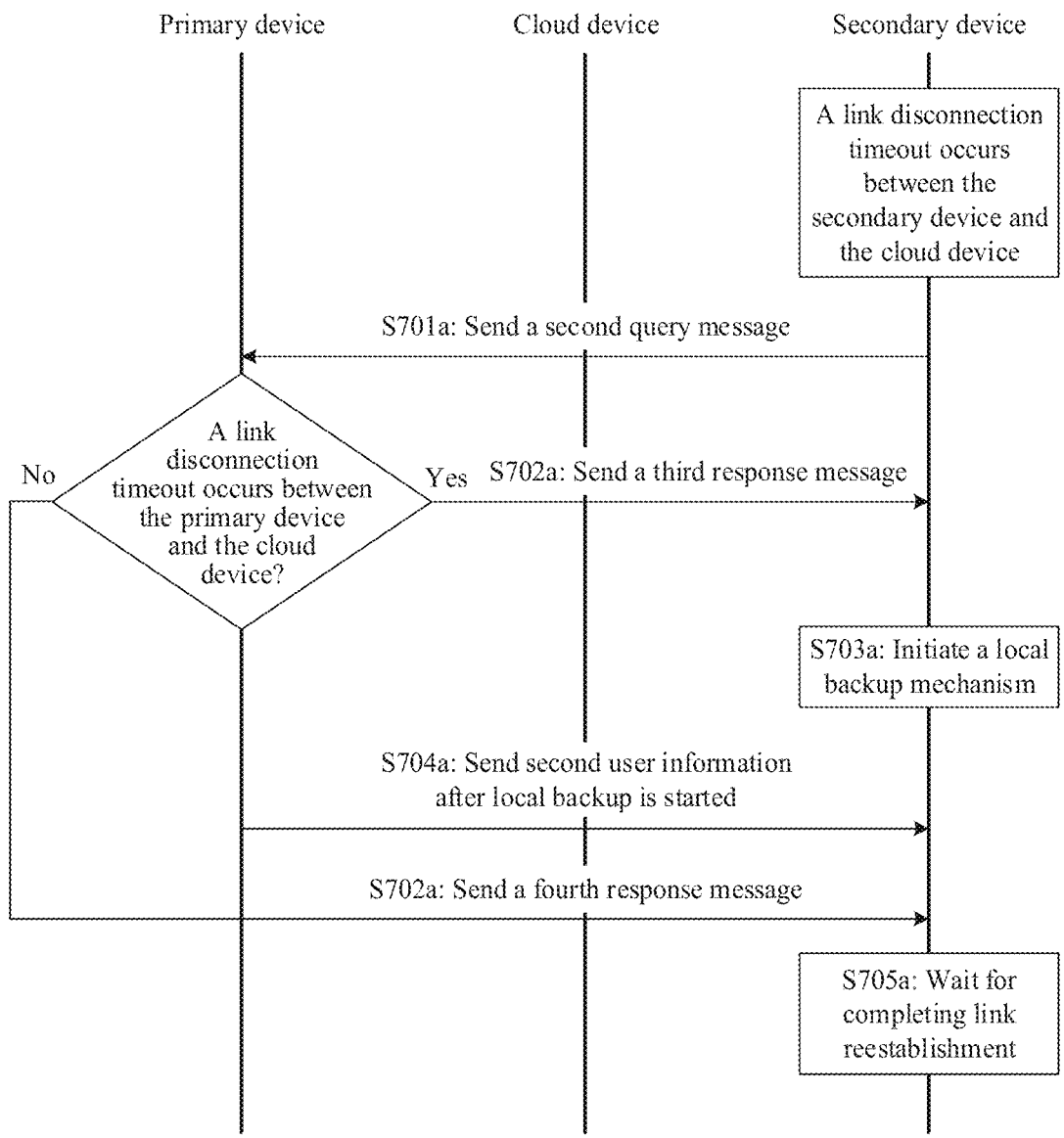
FIG. 7A is a schematic interaction diagram 3 of a local information backup method according to an embodiment of this application.

It should be noted that, for the primary device, if the secondary device first detects that a link disconnection timeout occurs between the secondary device and the cloud device, local backup is implemented according to the following process shown in FIG. 7A. Certainly, when a primary-secondary protocol specifies that a secondary device is responsible for initiating a local backup mechanism, if the secondary device first detects that a link disconnection timeout occurs between the secondary device and the cloud device, local backup is implemented according to the following process shown in FIG. 7A. On the contrary, if the primary device first detects that a link disconnection timeout occurs between the primary device and the cloud device, local backup is implemented according to the following process shown in FIG. 7B. Details are as follows.

FIG. 7A is a schematic interaction diagram of a method for local backup of user information. The local backup method may include the following steps.

S701a: A secondary device sends a second query message to a primary device if detecting that a link disconnection timeout occurs between the secondary device and a cloud device and that the secondary device and the primary device can normally communicate with each other, where the second query message is used to query whether a link disconnection timeout occurs between the primary device and the cloud device.

For the primary device, if the secondary device first detects that the link disconnection timeout occurs between the secondary device and the cloud device, the secondary device queries whether a link disconnection timeout also occurs between the primary device and the cloud device.

Then the primary device may determine a communication status of the cloud device based on a link status between the primary device and the cloud device after receiving the second query message, that is, determine whether the communication status of the cloud device is normal or abnormal. The communication status of the cloud device may be determined according to the following steps.

S702a: After receiving the second query message, the primary device detects whether a link disconnection timeout occurs between the primary device and the cloud device, and if a link disconnection timeout occurs, the primary device determines that a communication status of the cloud device is abnormal, and returns a third response message to the secondary device, where the third response message is used to notify that the link disconnection timeout occurs between the primary device and the cloud device, or if no link disconnection timeout occurs, the primary device determines that a communication status of the cloud device is normal, and returns a fourth response message to the secondary device, where the fourth response message is used to notify that no link disconnection timeout occurs between the primary device and the cloud device.

S703a: If receiving the third response message returned by the primary device, the secondary device starts a local backup mechanism between the primary device and the secondary device.

After receiving the third response message, the secondary device determines that the link disconnection timeout occurs between the primary device and the cloud device and that the link disconnection timeout occurs between the secondary device and the cloud device. In this case, the secondary device determines that a fault occurs on the cloud device. Therefore, the primary device cannot back up data to the cloud device, and the secondary device cannot obtain to-be-backed-up data from the cloud device either. In this case, the secondary device initiates a three-way handshake with the primary device to start the local backup mechanism between the primary device and the secondary device. For a specific process of the three-way handshake, refer to related description in S404, and details are not repeated herein.

S704a: The primary device sends second user information to the secondary device for backup after the local backup mechanism is successfully initiated.

The primary device directly backs up the second user information to the secondary device after the local backup mechanism is successfully started. In addition, the primary device no longer sends to-be-backed-up data to the cloud device, and the secondary device no longer obtains to-be-backed-up data from the cloud device.

S705a: If receiving the fourth response message returned by the primary device, the secondary device waits for completing link reestablishment with the cloud device.

After receiving the fourth response message, the secondary device determines that a short link disconnection occurs only between the secondary device and the cloud device. In this case, the secondary device may perform link reestablishment with the cloud device, to restore a connection to the cloud device.

Before the link reestablishment between the secondary device and the cloud device succeeds, one or more user equipments may have got online from the primary device, and the primary device has generated to-be-backed-up information of the user equipment and backed up the to-be-backed-up information to the cloud device. Therefore, after the link reestablishment succeeds, the secondary device may obtain the data from the cloud device in batches for backup.

Figure 7B:
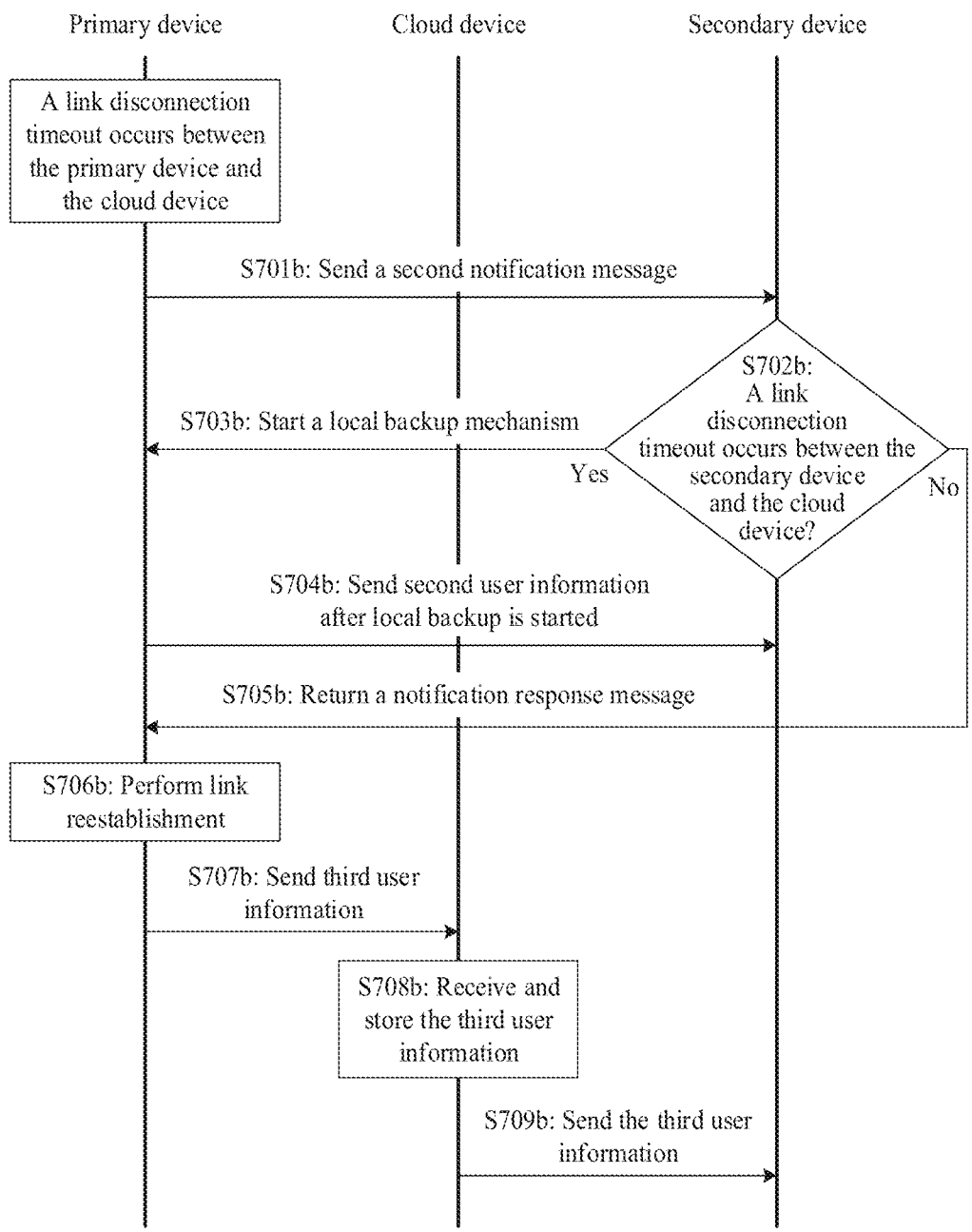
FIG. 7B is a schematic interaction diagram 4 of a local information backup method according to an embodiment of this application.

FIG. 7B is a schematic interaction diagram of a method for local backup of user information. The local backup method may include the following steps.

S701b: A primary device sends a second notification message to a secondary device if detecting that a link disconnection timeout occurs between the primary device and a cloud device and that the primary device and the secondary device can normally communicate with each other, where the second notification message is used to notify the secondary device that the link disconnection timeout occurs between the primary device and the cloud device.

For the secondary device, if the primary device first detects that the link disconnection timeout occurs between the primary device and the cloud device, the primary device notifies the secondary device that the link disconnection timeout occurs between the primary device and the cloud device. In this case, the primary device may determine a communication status of the cloud device based on a response of the secondary device to the second notification message, that is, determine whether the communication status of the cloud device is normal or abnormal. The communication status of the cloud device may be determined according to the following steps.

S702b: After receiving the second notification message, the secondary device determines whether a link disconnection timeout occurs between the secondary device and the cloud device, and if a link disconnection timeout occurs, performs S703b, or if no link disconnection timeout occurs, performs S705b.

If the link disconnection timeout also occurs between the secondary device and the cloud device, the primary device cannot back up data to the cloud device, and the secondary device cannot obtain to-be-backed-up data from the cloud device either. Therefore, the secondary device determines that a fault occurs on the cloud device.

S703b: The secondary device initiates a local backup mechanism between the primary device and the secondary device.

The secondary device initiates a three-way handshake with the primary device after determining that a fault occurs on the cloud device, to start the local backup mechanism between the primary device and the secondary device. For a specific process of the three-way handshake, refer to related description in S404, and details are not repeated herein.

S704b. After the local backup mechanism is successfully started, the primary device determines that a communication status of the cloud device is abnormal, and sends second user information to the secondary device for backup.

The primary device directly backs up the second user information to the secondary device after the local backup mechanism is successfully started. In addition, the primary device no longer sends to-be-backed-up data to the cloud device, and the secondary device no longer obtains to-be-backed-up data from the cloud device.

S705b: The secondary device returns a notification response message to the primary device, where the notification response message is used to instruct the primary device to wait for completing link reestablishment with the cloud device.

If no link disconnection timeout occurs between the secondary device and the cloud device, that is, a short disconnection occurs only between the primary device and the cloud device, the secondary device instructs the primary device to wait for completing link reestablishment with the cloud device. After receiving the notification, the primary device temporarily stops backing up data to the cloud device, but backs up data to the cloud device after a connection between the primary device and the cloud device is restored.

S706b: After receiving the notification response message, the primary device determines whether the communication status of the cloud device is normal, and the primary device performs link reestablishment with the cloud device.

S707b: After the link reestablishment between the primary device and the cloud device succeeds, the primary device sends obtained third user information to the cloud device in batches.

After a link disconnection occurs between the primary device and the cloud device and before the link reestablishment between the primary device and the cloud device succeeds, one or more user equipments may have got online from the primary device. In this embodiment, to-be-backed-up information of each user equipment is defined as third user information. Therefore, after the link reestablishment succeeds, the primary device may send the third user information to the cloud device in batches, to ensure that the secondary device can back up the third user information from the cloud device in a timely manner.

S708b: The cloud device receives and stores the third user information.

The cloud device records identity information of the primary device (for example, an IP address of the primary device). Therefore, after receiving the third user information, the cloud device may determine, based on the identity information of the primary device, that the third user information is uploaded by the primary device, and further store the third user information.

S709b: The secondary device obtains the third user information from the cloud device for backup.

Then the cloud device instructs the secondary device to download the third user information, or the cloud device directly delivers the third user information to the secondary device in order to implement backup of the user information.

It can be learned from the local backup processes shown in FIG. 7A and FIG. 7B that, if the link disconnection timeout occurs between the primary device and the cloud device and the link disconnection timeout occurs between the secondary device and the cloud device, that is, the primary device cannot back up data to the cloud device, and the secondary device cannot obtain to-be-backed-up data from the cloud device either, it indicates that a fault may have occurred on the cloud device. In this case, a backup mechanism based on the cloud device needs to be switched to a local backup mechanism between the primary device and the secondary device. This can ensure that information of a user that gets online from the primary device can be backed up on the secondary device side in a timely manner. In this way, once a fault occurs on a communications link between user equipment and the primary device, the secondary device may take over work of the primary device in a timely manner in order to ensure continuity of a user service. In addition, if a link disconnection occurs only between the cloud device and one of the primary device and the secondary device, it indicates that no fault occurs on the cloud device. Usually, a connection can be restored rapidly from the short link disconnection. Therefore, a party that encounters a link disconnection may perform data backup using the cloud device after connection restoration.

However, to avoid a case in which a connection of a party that encounters a link disconnection cannot be restored rapidly, in another implementation, the secondary device directly initiates a local backup mechanism provided that the link disconnection timeout occurs between the cloud device and one of the primary device and the secondary device but the primary device and the secondary device can normally communicate with each other, and the primary device sends to-be-backed-up information to the secondary device for backup after the local backup mechanism is successfully initiated. To be specific, in FIG. 7A, when the link disconnection timeout occurs between the secondary device and the cloud device, S703a and S704a are successively performed, and other steps are not performed, in FIG. 7B, when the link disconnection timeout occurs between the primary device and the cloud device, S701b, S703b, and S704b are successively performed, and other steps are not performed.

It should be noted that, when the primary device or the secondary device detects that quality of a link between the cloud device and one of the primary device and the secondary device is low, if the primary device and the secondary device can normally communicate with each other, the primary device or the secondary device starts a local backup mechanism between the primary device and the secondary device. The following provides specific description with reference to embodiments shown in FIG. 8A, FIG. 8B, FIG. 9A, and FIG. 9B. In addition, in another implementation of this embodiment, when quality of a link between the primary device and the cloud device is low and quality of a link between the secondary device and the cloud device is also low, if the primary device and the secondary device can normally communicate with each other, a local backup process similar to those shown in FIG. 6A, FIG. 6B, FIG. 7A, and FIG. 7B may be used, provided that the "link disconnection timeout" in embodiments shown in FIG. 6A, FIG. 6B, FIG. 7A, and FIG. 7B is replaced with "link quality is lower than a preset quality threshold".

Figure 8A:
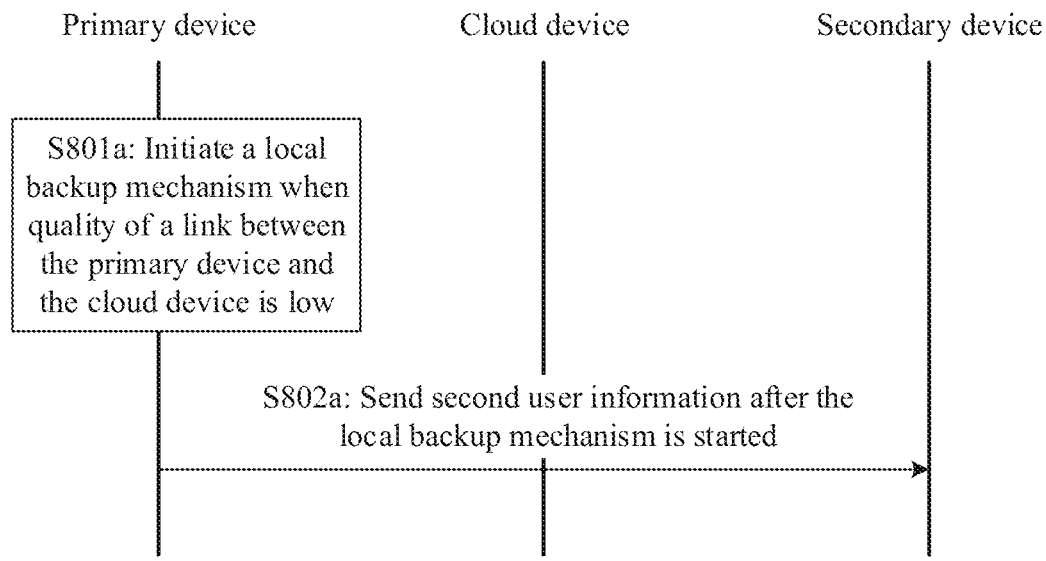
FIG. 8A is a schematic interaction diagram 5 of a local information backup method according to an embodiment of this application.

It should be noted that, for the primary device, if the primary device first detects that quality of a link between the primary device and the cloud device is lower than a preset quality threshold, local backup is implemented according to the following process shown in FIG. 8A. Certainly, a primary-secondary protocol may pre-specify a router device that initiates a local backup mechanism. When the primary-secondary protocol specifies that a primary device is responsible for initiating a local backup mechanism, if the primary device first detects that quality of a link between the primary device and the cloud device is lower than a preset quality threshold, local backup is implemented according to the following process shown in FIG. 8A. On the contrary, if the secondary device first detects that quality of a link between the secondary device and the cloud device is lower than a preset quality threshold, local backup is implemented according to the following process shown in FIG. 8B. Details are as follows.

FIG. 8A is a schematic interaction diagram of a method for local backup of user information. The local backup method may include the following steps.

S801a: If detecting that quality of a link between a primary device and a cloud device is lower than a preset quality threshold and that the primary device and a secondary device can normally communicate with each other, the primary device determines that a communication status of the cloud device is abnormal, and starts a local backup mechanism between the primary device and the secondary device.

For the secondary device, if the primary device first detects that the quality of the link between the primary device and the cloud device is low, the primary device initiates the local backup mechanism in a timely manner.

S802a: The primary device sends second user information to the secondary device for backup after successfully initiating the local backup mechanism.

When the quality of the link between the primary device and the cloud device is lower than the preset quality threshold, it indicates that the quality of the link between the two devices is relatively low or a fault occurs on a controller. In this case, if the primary device still backs up data to the cloud device, a data loss may occur. Therefore, when an RBS channel between the primary device and the secondary device has continuity and relatively high quantity, the primary device may initiate a three-way handshake with the secondary device, to start the local backup mechanism between the primary device and the secondary device. The primary device backs up the second user information to the secondary device after successfully initiating the local backup mechanism. In addition, the primary device no longer sends to-be-backed-up data to the cloud device, and the secondary device no longer obtains to-be-backed-up data from the cloud device.

For a specific process of the three-way handshake, refer to related description in S404, and details are not repeated herein.

Figure 8B:
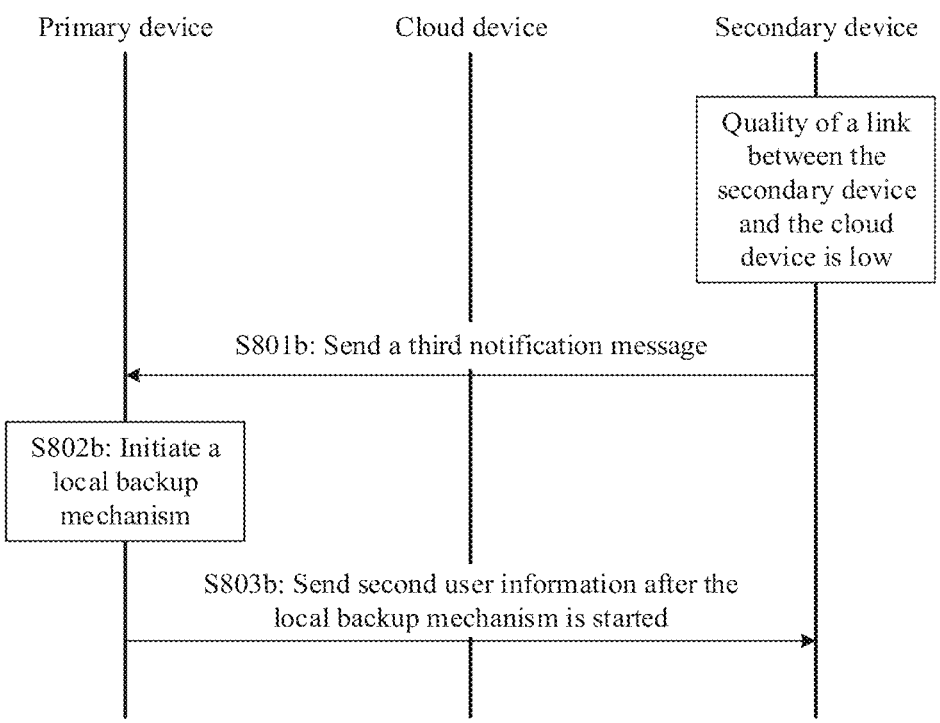
FIG. 8B is a schematic interaction diagram 6 of a local information backup method according to an embodiment of this application.

FIG. 8B is a schematic interaction diagram of a method for local backup of user information. The local backup method may include the following steps.

S801b: If detecting that quality of a link between a secondary device and a cloud device is lower than a preset quality threshold and that the secondary device and a primary device can normally communicate with each other, the secondary device sends a third notification message to the primary device.

For the primary device, if the secondary device first detects that the quality of the link between the secondary device and the cloud device is low, the secondary device notifies the primary device that the quality of the link between the secondary device and the cloud device is deteriorated such that the primary device starts a local backup mechanism in a timely manner.

S802b: After receiving the third notification message sent by the secondary device, the primary device determines that a communication status of the cloud device is abnormal, and starts a local backup mechanism between the primary device and the secondary device.

S803b: The primary device sends second user information to the secondary device for backup after successfully initiating the local backup mechanism.

When the quality of the link between the secondary device and the cloud device is lower than the preset quality threshold, it indicates that the quality of the link between the two devices is relatively low or a fault occurs on a controller. In this case, if the secondary device still obtains to-be-backed-up data from the cloud device, a data loss may occur. Therefore, when an RBS channel between the primary device and the secondary device has continuity and relatively high quantity, the primary device may initiate a three-way handshake with the secondary device, to start the local backup mechanism between the primary device and the secondary device. The primary device backs up the second user information to the secondary device after successfully initiating the local backup mechanism. In addition, the secondary device no longer obtains to-be-backed-up data from the cloud device.

For a specific process of the three-way handshake, refer to related description in S404, and details are not repeated herein.

In addition, when the quality of the link between the secondary device and the cloud device is low, if quality of a link between the primary device and the cloud device is relatively high, the primary device may back up data to the cloud device while backing up data to the secondary device, or if quality of a link between the primary device and the cloud device is also low, the primary device no longer sends to-be-backed-up data to the cloud device.

It should be noted that, in the foregoing embodiments shown in FIG. 8A and FIG. 8B, the primary device starts the local backup mechanism, while in the following embodiments shown in FIG. 9A and FIG. 9B, a secondary device starts a local backup mechanism. The following describes in detail the embodiments shown in FIG. 9A and FIG. 9B.

Figure 9A:
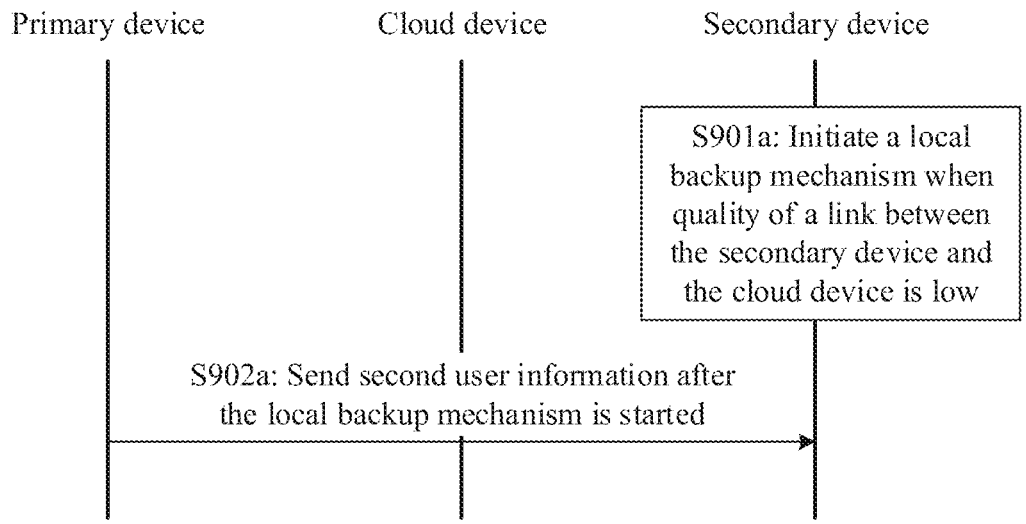
FIG. 9A is a schematic interaction diagram 7 of a local information backup method according to an embodiment of this application.

It should be noted that, for the secondary device, if the secondary device first detects that quality of a link between the secondary device and the cloud device is lower than a preset quality threshold, local backup is implemented according to the following process shown in FIG. 9A. Certainly, when a primary-secondary protocol specifies that a secondary device is responsible for initiating a local backup mechanism, if the secondary device first detects that quality of a link between the secondary device and the cloud device is lower than a preset quality threshold, local backup is implemented according to the following process shown in FIG. 9A. On the contrary, if the primary device first detects that quality of a link between the primary device and the cloud device is lower than a preset quality threshold, local backup is implemented according to the following process shown in FIG. 9B. Details are as follows FIG. 9A is a schematic interaction diagram of a method for local backup of user information. The local backup method may include the following steps.

S901a: If detecting that quality of a link between a secondary device and a cloud device is lower than a preset quality threshold and that the secondary device and a primary device can normally communicate with each other, the secondary device determines that a communication status of the cloud device is abnormal, and starts a local backup mechanism between the primary device and the secondary device.

For the primary device, if the secondary device first detects that the quality of the link between the secondary device and the cloud device is low, the secondary device initiates the local backup mechanism in a timely manner.

S902a: The primary device sends second user information to the secondary device for backup after the local backup mechanism is successfully initiated.

When the quality of the link between the secondary device and the cloud device is lower than the preset quality threshold, it indicates that the quality of the link between the two devices is relatively low or a fault occurs on a controller. In this case, if the secondary device still obtains to-be-backed-up data from the cloud device, a data loss may occur. Therefore, when an RBS channel between the primary device and the secondary device has continuity and relatively high quantity, the secondary device may initiate a three-way handshake with the primary device, to start the local backup mechanism between the primary device and the secondary device. The primary device backs up the second user information to the secondary device after the local backup mechanism is successfully started. In addition, the secondary device no longer obtains to-be-backed-up data from the cloud device.

For a specific process of the three-way handshake, refer to related description in S404, and details are not repeated herein.

In addition, if quality of a link between the primary device and the cloud device is relatively high, the primary device may back up data to the cloud device while backing up data to the secondary device, or if quality of a link between the primary device and the cloud device is also low, the primary device no longer sends to-be-backed-up data to the cloud device.

Figure 9B:
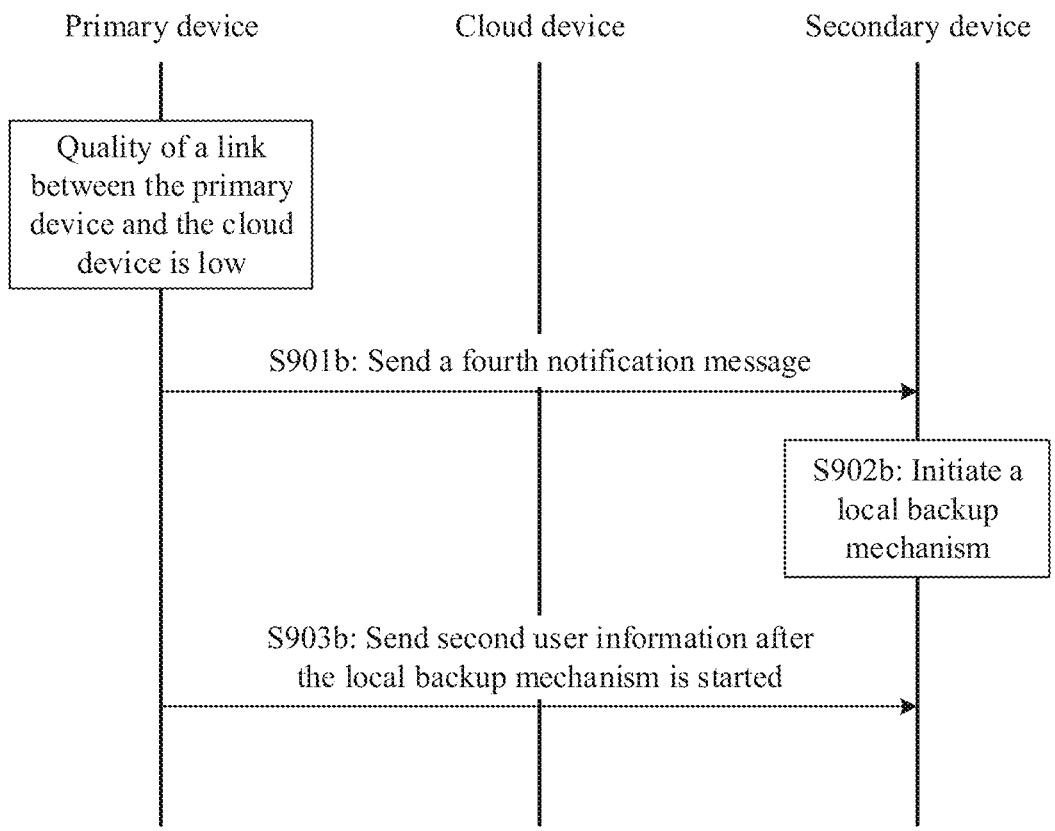
FIG. 9B is a schematic interaction diagram 8 of a local information backup method according to an embodiment of this application.

FIG. 9B is a schematic interaction diagram of a method for local backup of user information. The local backup method may include the following steps.

S901b: If detecting that quality of a link between a primary device and a cloud device is lower than a preset quality threshold and that the primary device and a secondary device can normally communicate with each other, the primary device sends a fourth notification message to the secondary device.

For the secondary device, if the primary device first detects that the quality of the link between the primary device and the cloud device is low, the primary device notifies the secondary device that the quality of the link between the primary device and the cloud device is deteriorated such that the secondary device starts a local backup mechanism in a timely manner.

S902b: After receiving the fourth notification message sent by the primary device, the secondary device determines that a communication status of the cloud device is abnormal, and starts a local backup mechanism between the primary device and the secondary device.

S903b: The primary device sends second user information to the secondary device for backup after the local backup mechanism is successfully initiated.

When the quality of the link between the primary device and the cloud device is lower than the preset quality threshold, it indicates that the quality of the link between the two devices is relatively low or a fault occurs on a controller. In this case, if the primary device still backs up data to the cloud device, a data loss may occur. Therefore, when an RBS channel between the primary device and the secondary device has continuity and relatively high quantity, the secondary device may initiate a three-way handshake with the primary device, to start the local backup mechanism between the primary device and the secondary device. The primary device backs up the second user information to the secondary device after the local backup mechanism is successfully started. In addition, the primary device no longer sends to-be-backed-up data to the cloud device, and the secondary device no longer obtains to-be-backed-up data from the cloud device.

For a specific process of the three-way handshake, refer to related description in S404, and details are not repeated herein.

It can be learned from the local backup processes shown in FIG. 8A, FIG. 8B, FIG. 9A, and FIG. 9B that, if the quality of the link between the primary device and the cloud device is deteriorated, to-be-backed-up data uploaded by the primary device to the cloud device may be lost, and if the quality of the link between the secondary device and the cloud device is deteriorated, to-be-backed-up data delivered by the cloud device to the secondary device may be lost. When one of the foregoing cases occurs or both cases occur, it cannot be ensured that the secondary device obtains complete to-be-backed-up data. Therefore, a backup mechanism based on the cloud device needs to be switched to a local backup mechanism between the primary device and the secondary device, to ensure that information of a user that gets online from the primary device can be completely backed up on the secondary device side. In this way, once a fault occurs on a communications link between user equipment and the primary device, the secondary device may take over the work of the primary device in a timely manner in order to ensure continuity of a user service.

In some embodiments of this application, when the primary device and the secondary device cannot normally communicate with each other, the primary device and the cloud device cannot normally communicate with each other neither, but the secondary device and the cloud device can normally communicate with each other. In this case, primary-secondary identity switching may be performed. To be specific, the primary device is switched from a primary device identity to a secondary device identity, while the secondary device is switched from a secondary device identity to a primary device identity.

That the primary device and the secondary device cannot normally communicate with each other may be a link disconnection timeout occurs between the primary device and the secondary device, or quality of a link between the primary device and the secondary device is lower than a preset quality threshold.

That the primary device and the cloud device cannot normally communicate with each other may be the link disconnection timeout occurs between the primary device and the cloud device, or the quality of the link between the primary device and the cloud device is lower than the preset quality threshold.

In this embodiment, because the primary device and the secondary device cannot normally communicate with each other, the local backup mechanism between the primary device and the secondary device cannot be started. In addition, because the primary device and the cloud device cannot normally communicate with each other either, the primary device cannot back up data to the cloud device or cannot back up complete data to the cloud device. In this case, the secondary device is switched from a secondary device identity to a primary device identity through primary-secondary identity switching such that user equipment may get online from the primary device after identity switching. In this case, the primary device after identity switching backs up data to the cloud device, and data backup is performed after a link between the secondary device after identity switching and the cloud device becomes normal in order to ensure backup reliability.

To better implement the foregoing solutions in the embodiments of this application, the following further provides related apparatuses configured to implement the foregoing solutions.

Figure 10:
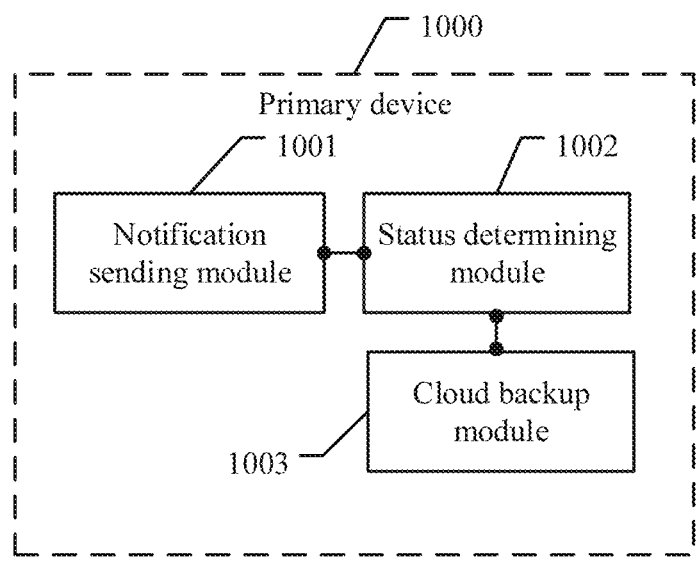
FIG. 10 is a schematic composition diagram 1 of a primary device according to an embodiment of this application.

FIG. 10 shows a primary device 1000 according to an embodiment of this application. The primary device 1000 may include a notification sending module 1001, a status determining module 1002, and a cloud backup module 1003.

The notification sending module 1001 is configured to send a first identity notification to a cloud device, where the first identity notification is a notification indicating that the primary device has a primary device identity.

The status determining module 1002 is configured to determine a communication status of the cloud device. For a specific implementation, refer to descriptions of functions of the following specific modules and detailed descriptions of step S505 and related steps in FIG. 6A to FIG. 9B the foregoing method embodiments.

The cloud backup module 1003 is configured to upload obtained first user information to the cloud device when it is determined that the communication status of the cloud device is normal.

The first user information is stored by the cloud device and provided to a secondary device, and the first user information is to-be-backed-up information of user equipment that gets online from the primary device when the communication status of the cloud device is normal.

For a specific implementation of a function implementation of the notification sending module, refer to the method step S402. For function implementations of the status determining module and the cloud backup module, refer to the method steps S501 and S502.

In some embodiments of this application, the primary device 1000 may further include a local backup module configured to, when the communication status of the cloud device is abnormal and that the primary device and the secondary device can normally communicate with each other, send obtained second user information to the secondary device for backup, where the second user information is to-be-backed-up information of user equipment that gets online from the primary device when the communication status of the cloud device is abnormal.

For a function implementation of the local backup module, refer to functions of the following submodules and the steps corresponding to local backup in FIG. 6A to FIG. 9B.

In some embodiments of this application, the status determining module 1002 may include a query sending submodule configured to send a first query message to the secondary device after it is detected that a link disconnection timeout occurs between the primary device and the cloud device, where the first query message is used to query whether a link disconnection timeout occurs between the secondary device and the cloud device, and a first determining submodule configured to determine the communication status of the cloud device based on a response message received from the secondary device.

For function implementations of the query sending submodule and the first determining submodule, refer to the method steps S601a to S604a.

In some embodiments of this application, the first determining submodule is further configured to, if a first response message returned by the secondary device is received, determine that the communication status of the cloud device is abnormal, where the first response message is used to notify that a link disconnection timeout occurs between the secondary device and the cloud device.

The local backup module is further configured to start a local backup mechanism between the primary device and the secondary device before sending the obtained second user information to the secondary device for backup.

In some embodiments of this application, the first determining submodule is further configured to, if a second response message returned by the secondary device is received, determine that the communication status of the cloud device is normal, where the second response message is used to notify that no link disconnection timeout occurs between the secondary device and the cloud device.

The primary device 1000 may further include a first link reestablishment module configured to perform link reestablishment between the primary device and the cloud device, and a first batch backup module configured to send obtained third user information to the cloud device in batches after the link reestablishment succeeds, where the third user information is stored by the cloud device and provided to the secondary device, and the third user information is to-be-backed-up information of user equipment that gets online from the primary device after a link disconnection occurs between the primary device and the cloud device and before the link reestablishment succeeds.

For function implementations of the first link reestablishment module and the first batch backup module, refer to the method steps S604a and S605a.

In some embodiments of this application, the status determining module 1002 may include a notification receiving submodule configured to receive a first notification message sent by the secondary device, where the first notification message is used to notify that a link disconnection timeout occurs between the secondary device and the cloud device, and a second determining submodule configured to determine the communication status of the cloud device based on a link status between the primary device and the cloud device after the first notification message is received.

For function implementations of the notification receiving submodule and the second determining submodule, refer to the method step S602b.

In some embodiments of this application, the second determining submodule is further configured to, if a link disconnection timeout occurs between the primary device and the cloud device, determine that the communication status of the cloud device is abnormal.

The local backup module is further configured to start a local backup mechanism between the primary device and the secondary device before sending the obtained second user information to the secondary device for backup.

For a function implementation of the local backup module, refer to the method step S603b.

In some embodiments of this application, the second determining submodule is further configured to, if determining that no link disconnection timeout occurs between the primary device and the cloud device, determine that the communication status of the cloud device is normal.

The primary device 1000 may further include a reestablishment notification module configured to instruct the secondary device to wait for completing link reestablishment with the cloud device.

For a function implementation of the reestablishment notification module, refer to the method step S604b.

In some embodiments of this application, the status determining module 1002 may include a query receiving submodule configured to receive a second query message sent by the secondary device, where the second query message is sent by the secondary device after the secondary device determines that a link disconnection timeout occurs between the secondary device and the cloud device, and the second query message is used to query whether a link disconnection timeout occurs between the primary device and the cloud device, and a third determining submodule configured to determine the communication status of the cloud device based on a link status between the primary device and the cloud device after the second query message is received.

For a function implementation of the query receiving submodule, refer to the method step S701a. For a function implementation of the third determining submodule, refer to the method step S702a.

In some embodiments of this application, the third determining submodule is further configured to, if a link disconnection timeout occurs between the primary device and the cloud device, determine that the communication status of the cloud device is abnormal.

The primary device 1000 may further include a first response sending module configured to send a third response message to the secondary device after the local backup module sends the obtained second user information to the secondary device for backup such that the secondary device starts a local backup mechanism between the primary device and the secondary device after receiving the third response message, where the third response message indicates that the link disconnection timeout occurs between the primary device and the cloud device.

For a function implementation of the first response sending module, refer to the method step S702a.

In some embodiments of this application, the third determining submodule is further configured to, if determining that no link disconnection timeout occurs between the primary device and the cloud device, determine that the communication status of the cloud device is normal.

The primary device 1000 may further include a second response sending module configured to send a fourth response message to the secondary device such that after receiving the fourth response message, the secondary device waits for completing link reestablishment with the cloud device, where the fourth response message indicates that no link disconnection timeout occurs between the primary device and the cloud device.

For a function implementation of the second response sending module, refer to the method step S702a.

In some embodiments of this application, the status determining module 1002 may include a notification sending submodule configured to send a second notification message to the secondary device after it is detected that a link disconnection timeout occurs between the primary device and the cloud device, where the second notification message is used to notify the secondary device that the link disconnection timeout occurs between the primary device and the cloud device, and a fourth determining submodule configured to determine the communication status of the cloud device based on a response of the secondary device to the second notification message.

For a function implementation of the notification sending submodule, refer to the method step S701b. For a function implementation of the fourth determining submodule, refer to the method steps S702b to S706b.

In some embodiments of this application, the fourth determining submodule is further configured to, if determining that the secondary device has started a local backup mechanism between the primary device and the secondary device, determine that the communication status of the cloud device is abnormal.

In some embodiments of this application, the fourth determining submodule is further configured to, if a notification response message returned by the secondary device is received, determine that the communication status of the cloud device is normal, where the notification response message is used to instruct the primary device to wait for completing link reestablishment with the cloud device.

The primary device 1000 may further include a second link reestablishment module configured to perform link reestablishment between the primary device and the cloud device, and a second batch backup module configured to send obtained third user information to the cloud device in batches after the link reestablishment succeeds, where the third user information is stored by the cloud device and provided to the secondary device, and the third user information is to-be-backed-up information of user equipment that gets online from the primary device after a link disconnection occurs between the primary device and the cloud device and before the link reestablishment succeeds.

For a function implementation of the second link reestablishment module, refer to the method step S706b. For a function implementation of the second batch backup module, refer to the method step S707b.

In some embodiments of this application, the status determining module 1002 is further configured to, if determining that quality of a link between the primary device and the cloud device is lower than a preset quality threshold and/or determining that quality of a link between the secondary device and the cloud device is lower than a preset quality threshold, determine that the communication status of the cloud device is abnormal.

For function implementations of the status determining module, refer to the method steps S801a and S802a and the method steps S801b to S803b.

In some embodiments of this application, the primary device 1000 may further include an identity switching module configured to switch the primary device identity of the primary device to a secondary device identity when it is determined that the primary device and the cloud device cannot normally communicate with each other and that the primary device and the secondary device cannot normally communicate with each other.

For a function implementation of the identity switching module, refer to content of primary-secondary identity switching in the foregoing method.

In some embodiments of this application, that the primary device and the cloud device cannot normally communicate with each other may include the link disconnection timeout occurs between the primary device and the cloud device, or the quality of the link between the primary device and the cloud device is lower than the preset quality threshold.

In some embodiments of this application, that the primary device and the secondary device cannot normally communicate with each other may include a link disconnection timeout occurs between the primary device and the secondary device, or quality of a link between the primary device and the secondary device is lower than a preset quality threshold.

It can be learned from the foregoing descriptions of this embodiment of this application that, when the communication status of the cloud device is normal, if user equipment gets online from the primary device, the primary device generates to-be-backed-up information of the user equipment and uploads the to-be-backed-up information to the cloud device. In this way, the secondary device can obtain the to-be-backed-up information from the cloud device for backup. It can be learned that in this embodiment of this application, the primary device backs up information to the secondary device using the cloud device. This avoids discontinuity of a user service caused when the primary device directly backs up information to the secondary device. Further, when the communication status of the cloud device is abnormal, that is, when data backup cannot be implemented using the cloud device, if the primary device and the secondary device can normally communicate with each other, the primary device may directly back up information to the secondary device. This improves backup reliability.

Figure 11:
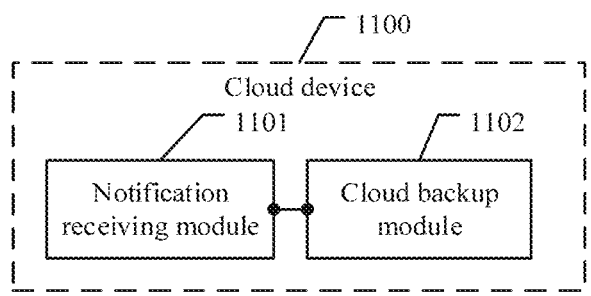
FIG. 11 is a schematic composition diagram 1 of a cloud device according to an embodiment of this application.

FIG. 11 shows a cloud device 1100 according to an embodiment of this application. The cloud device 1100 may include a notification receiving module 1101 and a cloud backup module 1102.

The notification receiving module 1101 is configured to receive a first identity notification sent by a primary device and a second identity notification sent by a secondary device, where the first identity notification is a notification indicating that the primary device has a primary device identity, and the second identity notification is a notification indicating that the secondary device has a secondary device identity.

The cloud backup module 1102 is configured to receive and store first user information uploaded by the primary device, and provide the first user information to the secondary device.

The first user information is uploaded by the primary device when the primary device determines that a communication status of the cloud device is normal, and the first user information is to-be-backed-up information of user equipment that gets online from the primary device when the communication status of the cloud device is normal.

For a function implementation of the notification receiving module, refer to the method steps S402 and S403. For a function implementation of the cloud backup module, refer to the method step S503.

It can be learned from the foregoing descriptions of this embodiment of this application that, when the communication status of the cloud device is normal, if user equipment gets online from the primary device, the primary device generates to-be-backed-up information of the user equipment and uploads the to-be-backed-up information to the cloud device. In this way, the secondary device can obtain the to-be-backed-up information from the cloud device for backup. It can be learned that in this embodiment of this application, the primary device backs up information to the secondary device using the cloud device. This avoids discontinuity of a user service caused when the primary device directly backs up information to the secondary device.

Figure 12:
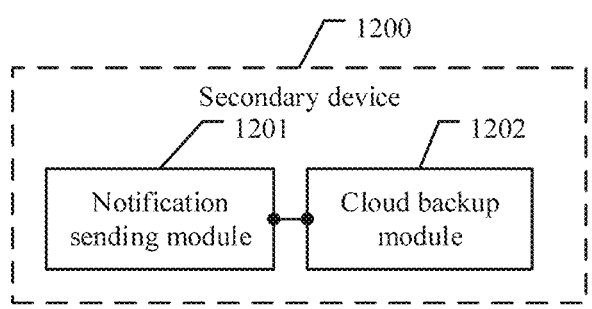
FIG. 12 is a schematic composition diagram 1 of a secondary device according to an embodiment of this application.

FIG. 12 shows a secondary device 1200 according to an embodiment of this application. The secondary device 1200 may include a notification sending module 1201 and a cloud backup module 1202.

The notification sending module 1201 is configured to send a second identity notification to a cloud device, where the second identity notification is a notification indicating that the secondary device has a secondary device identity.

The cloud backup module 1202 is configured to obtain first user information from the cloud device for backup.

The first user information is uploaded by the primary device to the cloud device for storage when the primary device determines that a communication status of the cloud device is normal, and the first user information is to-be-backed-up information of user equipment that gets online from the primary device when the communication status of the cloud device is normal.

For a function implementation of the notification sending module, refer to the method step S402. For a function implementation of the cloud backup module, refer to the method step S504.

In some embodiments of this application, the secondary device 1200 may further include a local backup module configured to, when the communication status of the cloud device is abnormal, receive second user information sent by the primary device for backup.

The second user information is to-be-backed-up information of user equipment that gets online from the primary device when the communication status of the cloud device is abnormal, and the second user information is sent by the primary device when the primary device determines that the communication status of the cloud device is abnormal and that the primary device and the secondary device can normally communicate with each other.

For a function implementation of the local backup module, refer to functions of the following submodules and the steps corresponding to local backup in FIG. 6A to FIG. 9B.

In some embodiments of this application, the secondary device 1200 may further include a message returning module configured to return a response message to the primary device if a first query message sent by the primary device is received.

The first query message is sent by the primary device after the primary device detects that a link disconnection timeout occurs between the primary device and the cloud device, the first query message is used to query whether a link disconnection timeout occurs between the secondary device and the cloud device, and the response message returned by the secondary device is used by the primary device to determine the communication status of the cloud device.

For a function implementation of the message returning module, refer to the method step S602a.

In some embodiments of this application, the message returning module is further configured to return a first response message to the primary device.

The first response message is used to notify that a link disconnection timeout occurs between the secondary device and the cloud device such that after learning that the link disconnection timeout occurs between the secondary device and the cloud device, the primary device determines that the communication status of the cloud device is abnormal, and starts a local backup mechanism between the primary device and the secondary device after determining that the communication status of the cloud device is abnormal.

The local backup module is further configured to receive the second user information sent by the primary device after the primary device starts the local backup mechanism and used for backup.

In some embodiments of this application, the message returning module is further configured to return a second response message to the primary device.

The second response message is used to notify that no link disconnection timeout occurs between the secondary device and the cloud device such that after learning that no link disconnection timeout occurs between the secondary device and the cloud device, the primary device determines that the communication status of the cloud device is normal, performs link reestablishment with the cloud device after determining that the communication status of the cloud device is normal, and sends obtained third user information to the cloud device in batches after the link reestablishment succeeds.

The third user information is stored by the cloud device and provided to the secondary device, and the third user information is to-be-backed-up information of user equipment that gets online from the primary device after a link disconnection occurs between the primary device and the cloud device and before the link reestablishment succeeds.

In some embodiments of this application, the secondary device 1200 may further include a notification sending module configured to send a first notification message to the primary device.

The first notification message is used to notify that a link disconnection timeout occurs between the secondary device and the cloud device such that after learning that a link disconnection timeout occurs between the secondary device and the cloud device, the primary device determines that the communication status of the cloud device is abnormal.

For a function implementation of the notification sending module, refer to the method step S601b.

In some embodiments of this application, the secondary device 1200 may further include a notification receiving module configured to receive a reestablishment waiting notification sent by the primary device.

The reestablishment waiting notification is used to instruct the secondary device to wait for completing link reestablishment with the cloud device, the reestablishment waiting notification is sent by the primary device after the primary device determines that the communication status of the cloud device is normal, and that the communication status of the cloud device is normal is determined by the primary device after the primary device determines that no link disconnection timeout occurs between the primary device and the cloud device.

For a function implementation of the notification receiving module, refer to the method step S604b.

In some embodiments of this application, the secondary device 1200 may further include a query sending module configured to send a second query message to the primary device after it is determined that a link disconnection timeout occurs between the secondary device and the cloud device, where the second query message is used to query whether a link disconnection timeout occurs between the primary device and the cloud device.

The local backup module is further configured to, if a third response message returned by the primary device is received, learn, based on the third response message, that the communication status of the cloud device is abnormal, start a local backup mechanism between the primary device and the secondary device, and after successfully starting the local backup mechanism, receive the second user information sent by the primary device for backup, where the third response message is used to notify that a link disconnection timeout occurs between the primary device and the cloud device.

For a function implementation of the query sending module, refer to the method step S701a. For a function implementation of the local backup module, refer to the method steps S703a and S704a.

In some embodiments of this application, the secondary device 1200 may further include a link reestablishment module configured to, if a fourth response message returned by the primary device is received, complete link reestablishment between the secondary device and the cloud device, where the fourth response message is used to notify that no link disconnection timeout occurs between the primary device and the cloud device.

For a function implementation of the link reestablishment module, refer to the method step S705a.

In some embodiments of this application, the secondary device 1200 may further include a notification responding module configured to, if a second notification message sent by the primary device is received, make a response to the second notification message.

The second notification message is sent by the primary device after the primary device detects that a link disconnection timeout occurs between the primary device and the cloud device, the second notification message is used to notify the secondary device that the link disconnection timeout occurs between the primary device and the cloud device, and the response of the secondary device to the second notification message is used by the primary device to determine the communication status of the cloud device.

For a function implementation of the notification responding module, refer to the method steps S702b, S703b, and S705b.

In some embodiments of this application, the notification responding module is further configured to start a local backup mechanism between the primary device and the secondary device such that after the local backup mechanism is started, the primary device determines that the communication status of the cloud device is abnormal.

The local backup module is further configured to after the local backup mechanism is successfully started, receive the second user information sent by the primary device for backup.

For a function implementation of the notification responding module, refer to the method step S704b.

In some embodiments of this application, the notification responding module is further configured to return a notification response message to the primary device.

The notification response message is used to instruct the primary device to wait for completing link reestablishment with the cloud device such that the primary device sends obtained third user information to the cloud device in batches after the link reestablishment succeeds, the third user information is stored by the cloud device and provided to the secondary device, and the third user information is to-be-backed-up information of user equipment that gets online from the primary device after a link disconnection occurs between the primary device and the cloud device and before the link reestablishment succeeds.

In some embodiments of this application, the secondary device 1200 may further include the local backup module, further configured to start a local backup mechanism between the primary device and the secondary device if it is determined that quality of a link between the secondary device and the cloud device is lower than a preset quality threshold and/or it is determined that quality of a link between the primary device and the cloud device is lower than a preset quality threshold such that after the local backup mechanism is started, the primary device determines that the communication status of the cloud device is abnormal.

For a function implementation of the local backup module, refer to the method steps S901a and S902a and the method steps S901b to S903b.

In some embodiments of this application, the secondary device 1200 may further include an identity switching module configured to switch the secondary device identity of the secondary device to a primary device identity when it is determined that the secondary device and the cloud device can normally communicate with each other and that the secondary device and the primary device cannot normally communicate with each other.

For a function implementation of the identity switching module, refer to content of primary-secondary identity switching in the foregoing method.

In some embodiments of this application, that the secondary device and the primary device cannot normally communicate with each other may include a link disconnection timeout occurs between the secondary device and the primary device, or quality of a link between the secondary device and the primary device is lower than a preset quality threshold.

It can be learned from the foregoing descriptions of this embodiment of this application that, when the communication status of the cloud device is normal, if user equipment gets online from the primary device, the primary device generates to-be-backed-up information of the user equipment and uploads the to-be-backed-up information to the cloud device. In this way, the secondary device can obtain the to-be-backed-up information from the cloud device for backup. It can be learned that in this embodiment of this application, the primary device backs up information to the secondary device using the cloud device. This avoids discontinuity of a user service caused when the primary device directly backs up information to the secondary device. Further, when the communication status of the cloud device is abnormal, that is, when data backup cannot be implemented using the cloud device, if the primary device and the secondary device can normally communicate with each other, the primary device may directly back up information to the secondary device. This improves backup reliability.

It should be noted that content such as information exchange between the modules of the devices and the execution processes thereof is based on the same concept as the method embodiments of this application, and produces the same technical effects as the method embodiments of this application. For the specific content, refer to the foregoing descriptions in the method embodiments of this application. Details are not described herein again.

The following describes another primary device according to an embodiment of this application. The primary device includes a processor, a memory, a communications interface, and a bus. The processor, the communications interface, and the memory communicate with each other using the bus. The communications interface is configured to receive and send data. The memory is configured to store an instruction. The processor is configured to execute the instruction in the memory, to perform the foregoing information backup method.

Figure 13:
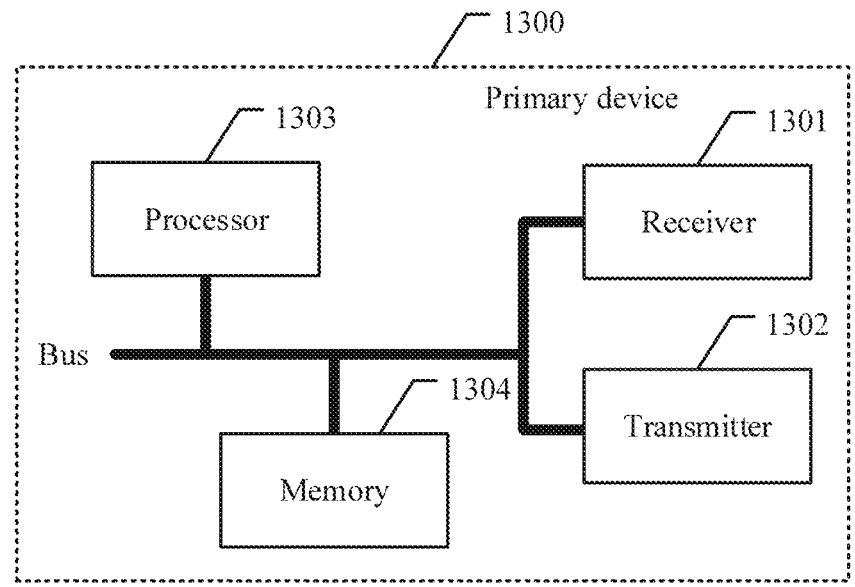
FIG. 13 is a schematic composition diagram 2 of a primary device according to an embodiment of this application.

The following describes the primary device in detail. As shown in FIG. 13, the primary device 1300 includes a receiver 1301, a transmitter 1302, a processor 1303, and a memory 1304 (there may be one or more processors 1303 on the primary device 1300, and one processor is used as an example in FIG. 13). The communications interface may include the receiver 1301 and the transmitter 1302. In some embodiments of this application, the receiver 1301, the transmitter 1302, the processor 1303, and the memory 1304 may be connected using a bus or in another manner, and a connection using the bus is used as example in FIG. 13.

The memory 1304 may include a read-only memory (ROM) and a random-access memory (RAM), and provide an instruction and data to the processor 1303. A part of the memory 1304 may further include a non-volatile RAM (NVRAM). The memory 1304 stores an operating system and an operation instruction, an executable module or a data structure, a subnet thereof, or an extended set thereof. The operation instruction may include various operation instructions to implement various operations. The operating system may include various system programs to implement various basic services and process hardware-based tasks.

The processor 1303 controls an operation of the primary device 1300, and the processor 1303 may be further referred to as a central processing unit (CPU). In a specific application, components are coupled together using a bus system. In addition to a data bus, the bus system includes a power bus, a control bus, a status signal bus, and the like. However, for clear description, various types of buses in the figure are collectively referred to as the bus system.

The method disclosed in the foregoing embodiments of this application may be applied to the processor 1303, or may be implemented by the processor 1303. The processor 1303 may be an integrated circuit chip and has a signal processing capability. In an implementation process, steps in the foregoing method may be implemented using a hardware integrated logical circuit in the processor 1303, or using instructions in a form of software. The processor 1303 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1303 may implement or perform the method, the steps, and logical block diagrams that are disclosed in the embodiments of this application. The general-purpose processor may be a microprocessor, or the processor may be any conventional processor or the like. Steps of the method disclosed with reference to the embodiments of this application may be directly executed and accomplished using a hardware decoding processor, or may be executed and accomplished using a combination of hardware and software modules in the decoding processor. A software module may be located in a mature storage medium in the art, such as a RAM, a flash memory, a ROM, a programmable ROM (PROM), an electrically erasable PROM (EEPROM), or a register. The storage medium is located in the memory 1304, and the processor 1303 reads information in the memory 1304 and completes the steps in the foregoing method in combination with the hardware of the processor.

The receiver 1301 may be configured to receive input digit or character information, and generate signal input related to a related setting and function control of the primary device 1300. The transmitter 1302 may include a display device such as a display screen, and the transmitter 1302 may be configured to output digit or character information through an external interface.

In this embodiment of this application, the processor 1303 is configured to perform the information backup method performed on the primary device side.

The following describes another cloud device according to an embodiment of this application. The cloud device includes a processor, a memory, a communications interface, and a bus. The processor, the communications interface, and the memory communicate with each other using the bus. The communications interface is configured to receive and send data. The memory is configured to store an instruction. The processor is configured to execute the instruction in the memory, to perform the foregoing information backup method.

Figure 14:
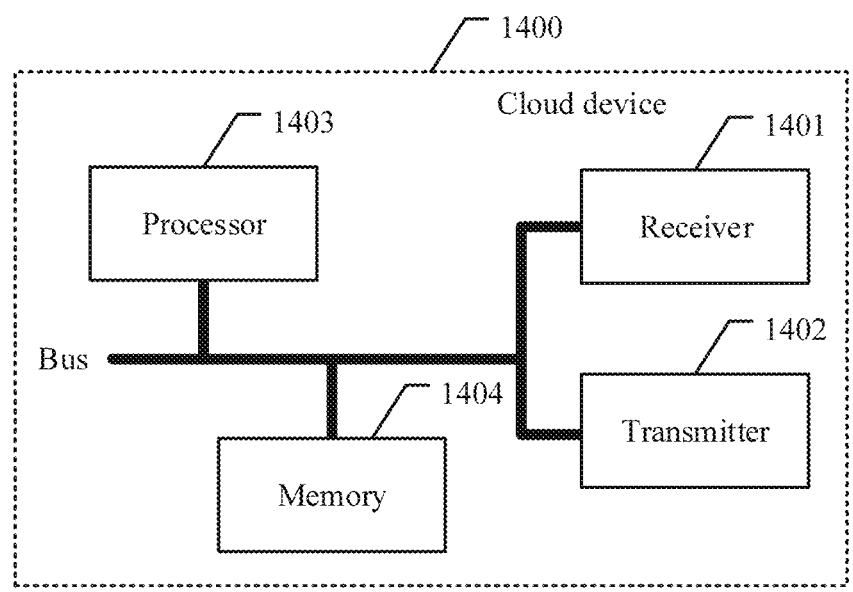
FIG. 14 is a schematic composition diagram 2 of a cloud device according to an embodiment of this application.

The following describes the cloud device in detail. As shown in FIG. 14, the cloud device 1400 includes a receiver 1401, a transmitter 1402, a processor 1403, and a memory 1404 (there may be one or more processors 1403 on the primary device 1400, and one processor is used as an example in FIG. 14). The communications interface may include the receiver 1401 and the transmitter 1402. In some embodiments of this application, the receiver 1401, the transmitter 1402, the processor 1403, and the memory 1404 may be connected using a bus or in another manner, and a connection using the bus is used as example in FIG. 14.

The memory 1404 may include a read-only memory and a RAM, and provide an instruction and data to the processor 1403. A part of the memory 1404 may further include an NVRAM. The memory 1404 stores an operating system and an operation instruction, an executable module or a data structure, a subnet thereof, or an extended set thereof. The operation instruction may include various operation instructions to implement various operations. The operating system may include various system programs to implement various basic services and process hardware-based tasks.

The processor 1403 controls an operation of the cloud device 1400, and the processor 1403 may be further referred to as a CPU. In a specific application, components are coupled together using a bus system. In addition to a data bus, the bus system includes a power bus, a control bus, a status signal bus, and the like. However, for clear description, various types of buses in the figure are collectively referred to as the bus system.

The method disclosed in the foregoing embodiments of this application may be applied to the processor 1403, or may be implemented by the processor 1403. The processor 1403 may be an integrated circuit chip and has a signal processing capability. In an implementation process, steps in the foregoing method may be implemented using a hardware integrated logical circuit in the processor 1403, or using instructions in a form of software. The processor 1403 may be a general-purpose processor, a DSP, an ASIC, an FPGA or another programmable logic device, a discrete gate or transistor logic device, or a discrete hardware component.

The processor 1403 may implement or perform the method, the steps, and logical block diagrams that are disclosed in the embodiments of this application. The general-purpose processor may be a microprocessor, or the processor may be any conventional processor or the like. Steps of the method disclosed with reference to the embodiments of this application may be directly executed and accomplished using a hardware decoding processor, or may be executed and accomplished using a combination of hardware and software modules in the decoding processor. A software module may be located in a mature storage medium in the art, such as a RAM, a flash memory, a ROM, a PROM, an EEPROM, or a register. The storage medium is located in the memory 1404, and the processor 1403 reads information in the memory 1404 and completes the steps in the foregoing method in combination with the hardware of the processor.

The receiver 1401 may be configured to receive input digit or character information, and generate signal input related to a related setting and function control of the cloud device 1400. The transmitter 1402 may include a display device such as a display screen, and the transmitter 1402 may be configured to output digit or character information through an external interface.

In this embodiment of this application, the processor 1403 is configured to perform the information backup method performed on the cloud device side.

The following describes another secondary device according to an embodiment of this application. The secondary device includes a processor, a memory, a communications interface, and a bus. The processor, the communications interface, and the memory communicate with each other using the bus. The communications interface is configured to receive and send data. The memory is configured to store an instruction. The processor is configured to execute the instruction in the memory, to perform the foregoing information backup method.

Figure 15:
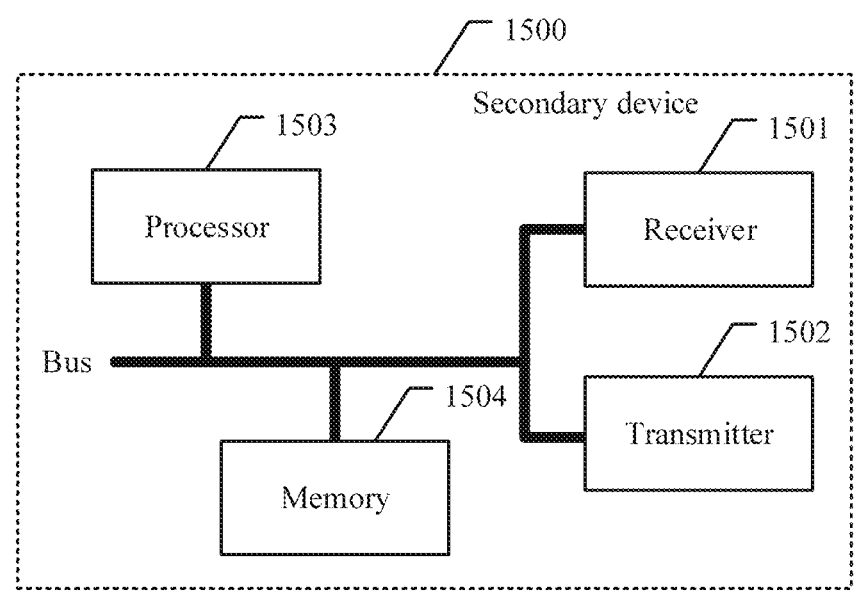
FIG. 15 is a schematic composition diagram 2 of a secondary device according to an embodiment of this application.

The following describes the secondary device in detail. As shown in FIG. 15, the secondary device 1500 includes a receiver 1501, a transmitter 1502, a processor 1503, and a memory 1504 (there may be one or more processors 1503 on the secondary device 1500, and one processor is used as an example in FIG. 15). The communications interface may include the receiver 1501 and the transmitter 1502. In some embodiments of this application, the receiver 1501, the transmitter 1502, the processor 1503, and the memory 1504 may be connected using a bus or in another manner, and a connection using the bus is used as example in FIG. 15.

The memory 1504 may include a ROM and a RAM, and provide an instruction and data to the processor 1503. A part of the memory 1504 may further include an NVRAM. The memory 1504 stores an operating system and an operation instruction, an executable module or a data structure, a subnet thereof, or an extended set thereof. The operation instruction may include various operation instructions to implement various operations. The operating system may include various system programs to implement various basic services and process hardware-based tasks.

The processor 1503 controls an operation of the secondary device 1500, and the processor 1503 may be further referred to as a CPU. In a specific application, components are coupled together using a bus system. In addition to a data bus, the bus system includes a power bus, a control bus, a status signal bus, and the like. However, for clear description, various types of buses in the figure are collectively referred to as the bus system.

The method disclosed in the foregoing embodiments of this application may be applied to the processor 1503, or may be implemented by the processor 1503. The processor 1503 may be an integrated circuit chip and has a signal processing capability. In an implementation process, steps in the foregoing method may be implemented using a hardware integrated logical circuit in the processor 1503, or using instructions in a form of software. The processor 1503 may be a general-purpose processor, a DSP, an ASIC, an FPGA or another programmable logic device, a discrete gate or transistor logic device, or a discrete hardware component. The processor 1503 may implement or perform the method, the steps, and logical block diagrams that are disclosed in the embodiments of this application. The general-purpose processor may be a microprocessor, or the processor may be any conventional processor or the like. Steps of the method disclosed with reference to the embodiments of this application may be directly executed and accomplished using a hardware decoding processor, or may be executed and accomplished using a combination of hardware and software modules in the decoding processor. A software module may be located in a mature storage medium in the art, such as a RAM, a flash memory, a ROM, a PROM, an EEPROM, or a register. The storage medium is located in the memory 1504, and the processor 1503 reads information in the memory 1504 and completes the steps in the foregoing method in combination with the hardware of the processor.

The receiver 1501 may be configured to receive input digit or character information, and generate signal input related to a related setting and function control of the secondary device 1500. The transmitter 1502 may include a display device such as a display screen, and the transmitter 1502 may be configured to output digit or character information through an external interface.

In this embodiment of this application, the processor 1503 is configured to perform the information backup method performed on the secondary device side.

An embodiment of this application further provides a computer storage medium. The computer storage medium stores a program. The program is executed to perform some or all of the steps recorded in the foregoing method embodiments.

An embodiment of this application further provides a computer program product including an instruction. When the computer program product is run on a computer, the computer is enabled to perform some or all of the steps recorded in the foregoing method embodiments.

In addition, it should be noted that the described apparatus embodiments are merely examples. The units described as separate parts may or may not be physically separate, and parts displayed as units may or may not be physical units, may be located on one position, or may be distributed on a plurality of network units. Some or all of the modules may be selected based on an actual requirement to achieve the objectives of the solutions of the embodiments. In addition, in the accompanying drawings of the apparatus embodiments provided by this application, connection relationships between the modules indicate that the modules have communication connections with each other, which may be implemented as one or more communications buses or signal cables.

Based on the descriptions of the foregoing implementations, a person skilled in the art may clearly understand that this application may be implemented using software in addition to necessary universal hardware, or using dedicated hardware, including a dedicated integrated circuit, a dedicated CPU, a dedicated memory, a dedicated component, and the like. Generally, any functions that can be implemented using a computer program can be easily implemented using corresponding hardware. Moreover, a specific hardware structure used to achieve a same function may be of various forms, for example, in a form of an analog circuit, a digital circuit, a dedicated circuit, or the like. However, as for this application, a software program implementation is a better implementation in most cases. Based on such an understanding, the technical solutions of this application essentially or the part contributing to the other approaches may be implemented in a form of a software product. The computer software product is stored in a readable storage medium, such as a floppy disk, a Universal Serial Bus (USB) flash drive, a removable hard disk, a ROM, a RAM, a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on the computer, all or some of the procedures or functions in the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. An information backup method, comprising:
   sending a first identity notification to a cloud device in a communications system from a primary device in the communications system, wherein the first identity notification indicates that the primary device has a primary device identity;
   determining a communication status of the cloud device;
   obtaining first user information, wherein the first user information comprises first to-be-backed-up information of a first user equipment that is coupled to the primary device when the communication status of the cloud device is normal; and
   uploading the first user information to the cloud device for storing and providing the first user information to a secondary device in the communications system when the communication status of the cloud device is normal.

2. The information backup method of claim 1, further comprising:

determining that the communication status of the cloud device is abnormal and that the primary device and the secondary device are configured to normally communicate with each other;

obtaining, in response to the determining, second user information, wherein the second user information comprises second to-be-backed-up information of a second user equipment that is coupled to the primary device when the communication status of the cloud device is abnormal; and sending the second user information to the secondary device for backup.

3. The information backup method of claim 2, further comprising:

detecting that a first link disconnection timeout has occurred between the primary device and the cloud device;

sending a first query message to the secondary device, wherein the first query message queries whether a second link disconnection timeout occurs between the secondary device and the cloud device; and determining the communication status of the cloud device based on a response message of the secondary device.

4. The information backup method of claim 3, further comprising:

receiving, from the secondary device, a first response message notifying that the second link disconnection timeout has occurred;

determining, in response to the receiving the first response message, that the communication status of the cloud device is abnormal; and starting a local backup mechanism between the primary device and the secondary device before sending the second user information to the secondary device.

5. The information backup method of claim 3, further comprising:

receiving, from the secondary device, a second response message notifying that the second link disconnection timeout has not occurred between the secondary device and the cloud device;

determining, in response to the second response message, that the communication status of the cloud device is normal;

performing a link reestablishment with the cloud device;

obtaining third user information, wherein the third user information comprises third to-be-backed-up information of a third user equipment that is coupled to the primary device after the first link disconnection timeout occurs between the primary device and the cloud device and before the link reestablishment succeeds; and sending, after the link reestablishment with the cloud device succeeds, the third user information to the cloud device in batches to enable the cloud device to store and provide the third user information to the secondary device.

6. The information backup method of claim 3, further comprising:

receiving, from the secondary device, a first notification message notifying that the second link disconnection timeout occurs between the secondary device and the cloud device; and determining the communication status of the cloud device based on a link status between the primary device and the cloud device after receiving the first notification message.

7. The information backup method of claim 6, further comprising:

determining that a first link disconnection timeout has occurred between the primary device and the cloud device;

determining, in response to the first link disconnection timeout occurring, that the communication status of the cloud device is abnormal; and starting a local backup mechanism between the primary device and the secondary device before sending the second user information to the secondary device.

8. An information backup method, comprising:

receiving a first identity notification from a primary device in a communications system, wherein the first identity notification indicates that the primary device has a primary device identity;

receiving a second identity notification from a secondary device in the communications system, wherein the second identity notification indicates that the secondary device has a secondary device identity;

receiving and storing first user information from the primary device, wherein the first user information is received when a communication status of a cloud device is normal, and wherein the first user information comprises first to-be-backed-up information of a first user equipment that is coupled to the primary device when the communication status of the cloud device is normal; and providing the first user information to the secondary device.

9. An information backup method, comprising:

sending an identity notification to a cloud device in a communications system, wherein the identity notification indicates that a secondary device in the communications system has a secondary device identity; and obtaining first user information from the cloud device for backup, wherein the first user information comprises first to-be-backed-up information of a first user equipment that is coupled to a primary device in the communications system when a communication status of the cloud device is normal.

10. The information backup method of claim 9, further comprising receiving second user information from the primary device for backup when the communication status of the cloud device is abnormal, wherein the second user information is second to-be-backed-up information of a second user equipment that is coupled to the primary device when the communication status of the cloud device is abnormal, and wherein the second user information is received from the primary device when the communication status of the cloud device is abnormal and the primary device and the secondary device are configured to normally communicate with each other.

11. The information backup method of claim 10, further comprising:

receiving a first query message from the primary device after the primary device detects that a first link disconnection timeout has occurred between the primary device and the cloud device, wherein the first query message queries whether a second link disconnection timeout has occurred between the secondary device and the cloud device; and returning a response message to the primary device in response to the first query message, wherein the response message enables the primary device to determine the communication status of the cloud device.

12. The information backup method of claim 11, further comprising:
- returning a first response message to the primary device, wherein the first response message notifies that the second link disconnection timeout has occurred between the secondary device and the cloud device and enables the primary device to determine that the communication status of the cloud device is abnormal and to start a local backup mechanism between the primary device and the secondary device; and
- receiving the second user information from the primary device after the primary device starts the local backup mechanism and used for backup.

13. A primary device comprising:
- a memory configured to store instructions; and
- a processor coupled to the memory, wherein the instructions cause the processor to be configured to:
  - send a first identity notification to a cloud device, wherein the first identity notification indicates that the primary device has a primary device identity;
  - determine a communication status of the cloud device;
  - obtain first user information, wherein the first user information comprises first to-be-backed-up information of a first user equipment that is coupled to the primary device when the communication status of the cloud device is normal; and
  - upload the first user information to the cloud device to store and provide to a secondary device in a communications system when the communication status of the cloud device is normal.

14. The primary device of claim 13, wherein the instructions further cause the processor to be configured to:
- determine that the communication status of the cloud device is abnormal and the primary device and the secondary device are configured to normally communicate with each other;
- obtain second user information, wherein the second user information comprises second to-be-backed-up information of a second user equipment that is coupled to the primary device when the communication status of the cloud device is abnormal; and
- send the second user information to the secondary device for backup.

15. The primary device of claim 14, wherein the instructions further cause the processor to be configured to:
- detect that a first link disconnection timeout has occurred between the primary device and the cloud device;
- send a first query message to the secondary device, wherein the first query message queries whether a second link disconnection timeout occurs between the secondary device and the cloud device; and
- determine the communication status of the cloud device based on a response message from the secondary device.

16. The primary device of claim 15, wherein the instructions further cause the processor to be configured to:
- receive a first response message from the secondary device, wherein the first response message notifies that the second link disconnection timeout has occurred;
- determine that the communication status of the cloud device is abnormal; and
- start a local backup mechanism between the primary device and the secondary device before sending the second user information to the secondary device for backup.

17. A secondary device comprising:
- a memory configured to store instructions; and
- a processor coupled to the memory, wherein the instructions cause the processor to be configured to:
  - send an identity notification to a cloud device in a communications system, wherein the identity notification indicates that the secondary device in the communications system has a secondary device identity; and
  - obtain first user information from the cloud device for backup, wherein the first user information comprises first to-be-backed-up information of a first user equipment that is coupled to a primary device in the communications system when a communication status of the cloud device is normal.

18. The secondary device of claim 17, wherein the instructions further cause the processor to be configured to receive second user information from the primary device for backup when the communication status of the cloud device is abnormal, wherein the second user information comprises second to-be-backed-up information of a second user equipment that is coupled to the primary device when the communication status of the cloud device is abnormal, and wherein the second user information is sent by the primary device when the communication status of the cloud device is abnormal and the primary device and the secondary device are configured to normally communicate with each other.

19. The secondary device of claim 18, wherein the instructions further cause the processor to be configured to:
- receive a first query message from the primary device, wherein the first query message is received from the primary device after the primary device detects that a first link disconnection timeout has occurred between the primary device and the cloud device, and wherein the first query message queries whether a second link disconnection timeout has occurred between the secondary device and the cloud device; and
- return a response message to the primary device in response to the first query message, wherein the response message enables the primary device to determine the communication status of the cloud device.

20. The secondary device of claim 17, wherein the processor is configured to execute the instruction in the memory to cause the secondary device further to:
- determine that the secondary device and the cloud device are configured to normally communicate with each other and that the secondary device and the primary device are not configured to normally communicate with each other; and
- switch, in response to the determining, the secondary device identity of the secondary device to a primary device identity.

* * * * *